(12) United States Patent
Tremaine et al.

(10) Patent No.: US 11,264,787 B2
(45) Date of Patent: Mar. 1, 2022

(54) LOAD CENTER

(71) Applicant: QTran, Inc., Milford, CT (US)

(72) Inventors: John M. Tremaine, New Canaan, CT (US); Adrian Teschemaker, West Haven, CT (US)

(73) Assignee: Q-Tran, Inc., Milford, CT (US)

( * ) Notice: Subject to any disclaimer, the term of this patent is extended or adjusted under 35 U.S.C. 154(b) by 0 days.

(21) Appl. No.: 17/209,525

(22) Filed: Mar. 23, 2021

(65) Prior Publication Data

US 2021/0210941 A1 Jul. 8, 2021

Related U.S. Application Data

(60) Division of application No. 16/596,687, filed on Oct. 8, 2019, now Pat. No. 10,965,111, which is a continuation-in-part of application No. 15/448,947, filed on Mar. 3, 2017, now abandoned.

(60) Provisional application No. 62/304,266, filed on Mar. 6, 2016.

(51) Int. Cl.
| | |
|---|---|
| *H02G 5/08* | (2006.01) |
| *H02B 1/20* | (2006.01) |
| *H01R 9/24* | (2006.01) |
| *H02B 1/056* | (2006.01) |
| *H05K 5/02* | (2006.01) |
| *H02B 1/32* | (2006.01) |
| *H02G 3/08* | (2006.01) |

(52) U.S. Cl.
CPC ............. *H02G 5/08* (2013.01); *H01R 9/2416* (2013.01); *H02B 1/056* (2013.01); *H02B 1/20* (2013.01); *H02B 1/32* (2013.01); *H02G 3/081* (2013.01); *H05K 5/02* (2013.01)

(58) Field of Classification Search
CPC ........ H01R 9/2416; H02B 1/056; H02B 1/20; H02B 1/32; H02G 3/081; H02G 5/08; H05K 5/02
See application file for complete search history.

(56) References Cited

U.S. PATENT DOCUMENTS

| | | | | |
|---|---|---|---|---|
| 4,025,747 | A * | 5/1977 | Bharteey | H02B 1/056 200/254 |
| 6,424,519 | B2 * | 7/2002 | Soares | H02B 11/12 200/331 |
| 7,819,676 | B1 * | 10/2010 | Cardoso | H01R 13/245 439/115 |
| 8,908,335 | B2 * | 12/2014 | Malkowski, Jr | H02B 11/04 361/2 |
| 9,337,596 | B2 * | 5/2016 | El Zakhem | H01R 25/162 |
| 2001/0012194 | A1 * | 8/2001 | Soares | H02B 11/12 361/608 |
| 2002/0187682 | A1 * | 12/2002 | Lincoln, III | H01R 25/003 439/652 |
| 2006/0067018 | A1 * | 3/2006 | Malkowski, Jr. | H02B 11/04 361/2 |

(Continued)

*Primary Examiner* — Jacob R Crum
(74) *Attorney, Agent, or Firm* — Cygnet IP Law; Stephen W. Aycock, II

(57) ABSTRACT

Implementations include a compartmentalized plug-in load center having connector receptacles for load circuit wiring connection to the load center and a plug-in back plate to connect the plug-in load center to a vertical power busway within a utility wall panel of a building, and a method for installing the load center in a building with a vertical power busway.

12 Claims, 24 Drawing Sheets

(56) References Cited

U.S. PATENT DOCUMENTS

| | | | | |
|---|---|---|---|---|
| 2007/0291430 A1* | 12/2007 | Spitaels | ............... | H01R 25/003 361/79 |
| 2007/0291433 A1* | 12/2007 | Ziegler | .................. | H02B 1/056 361/93.1 |
| 2011/0140523 A1* | 6/2011 | Ziegler | ................... | H02J 9/062 307/44 |
| 2016/0013601 A1* | 1/2016 | El Zakhem | .......... | H01R 25/162 439/94 |

* cited by examiner

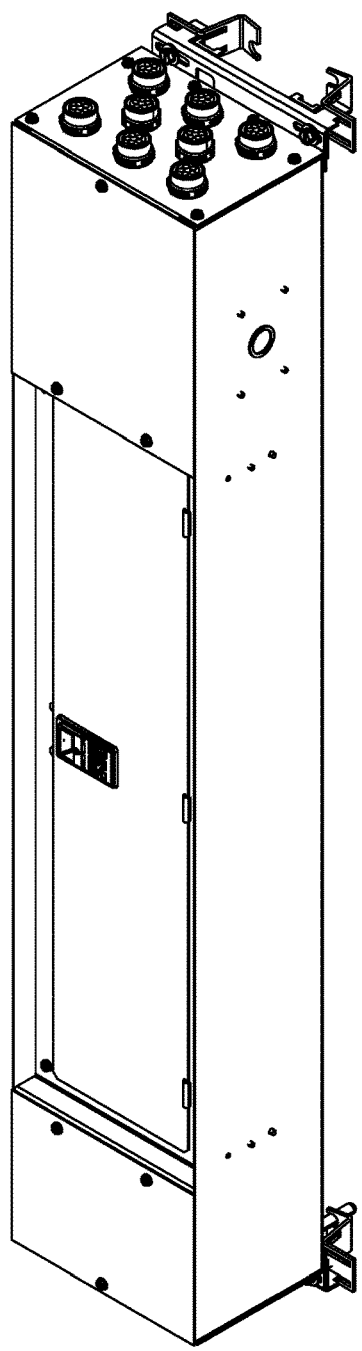
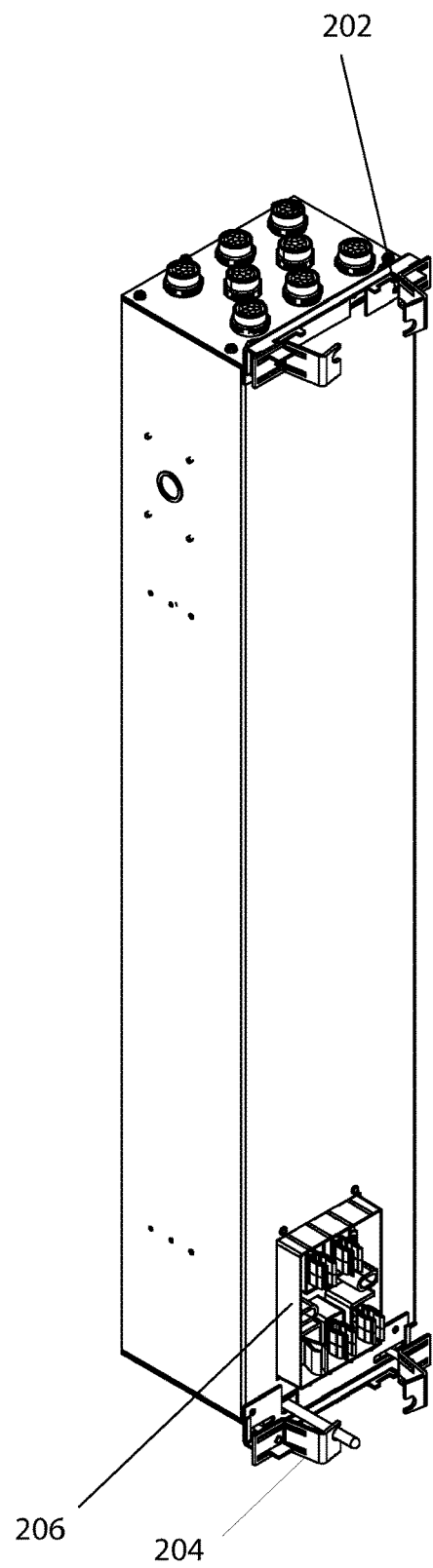
FIG. 8A
FIG. 8B

LOAD CENTER

RELATED APPLICATIONS

This application is a divisional under 35 U.S.C. § 121 of U.S. patent application Ser. No. 16/596,687, entitled "Load Center," and filed on Oct. 8, 2019, which in turn is a continuation-in-part under 35 U.S.C. § 120 of U.S. patent application Ser. No. 15/448,947, entitled "Load Center and Busway," and filed on Mar. 3, 2017 and now abandoned, which in turn is a non-provisional that claims priority under 35 U.S.C. § 119(e) to U.S. Provisional Patent Application No. 62/304,266, entitled "Load Center and Busway," and filed on Mar. 6, 2016. U.S. patent application Ser. Nos. 16/596,687 and 15/448,947 and U.S. Provisional Patent Application No. 62/304,266 are incorporated herein by reference in their entirety.

BACKGROUND

Installing conventional load centers in a multi-story, multi-unit building and connecting individual unit load circuits to respective load centers within the building requires substantial labor by one or more licensed electricians and, in some areas, an inspection by a city, state, local, or federal government electrical inspector. In addition to the labor required to install and connect convention load centers and load circuits wiring, conventional techniques of a centralized service area (e.g., a meter stack and main breakers) with "feeders" to individual units can require significant materials (e.g., wiring and conduit) and space (e.g., in a service run or raceway) for the feeders to run throughout the building. In a conventional electrical system for a multi-story building, a feeder may need to be run from the centralized service area to each unit. These feeders may extend from a first floor or basement service area up to the floor that a unit is located on, or from a centralized service area on a floor to the units on that floor. In either case, extensive wiring may be needed for the feeder lines. Moreover, multiple feeders passing vertically and/or horizontally require significant amounts of space. The space required depends on the number of feeders running in each area of the building.

Further, some conventional multi-unit building electrical systems includes wiring and horizontal busways that are constructed on site by electricians. The labor requirements for such site-built electrical systems in terms of both man-hours and overall time to complete can be significant. Site built electrical systems cannot leverage any of the efficiencies and quality control practices that have long been associated with the manufacturing industries, which have resulted in reliable and economical products.

Further, site-built electrical systems may require more extensive inspections and testing prior to occupancy due to the nature of site-built construction. These conventional electrical systems may also be prone to errors such as shorts or opens in the wiring and/or connections.

Some implementations were conceived in light of the above-mentioned problems and limitations, among other things.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations are generally related to load centers, and, in particular, to a compartmentalized load center with connector receptacles and a plug-in busway connector plate, and to a method for installing the same.

Some implementations can include a load center having a housing having a junction box compartment, a circuit breaker compartment, and a back-plate compartment, one or more circuit breakers disposed in the circuit breaker compartment, and a main switch disposed in the circuit breaker compartment. The load center can also include one or more connector receptacles mounted on a top of the housing, wherein each connector receptacle is connected to a corresponding circuit breaker, and wherein each connector receptacle is configured to engage a connector of a wiring assembly, and a plug-in back plate configured to mount in the back plate compartment and having one or more vertical power busway conductor connectors, wherein each of the plurality of busway conductor connectors are connected to a corresponding connection point within the load center.

The load center can further include a neutral bus and a ground bar disposed within the housing. In some implementations, the one or more vertical power busway conductor connectors can be configured to connect to a corresponding conductor of a vertical power busway.

In some implementations, the plurality of busway connectors can include a ground conductor busway connector configured to connect to a ground conductor, a neutral conductor busway connector configured to connect to a neutral conductor, and one or more power conductor busway connectors configured to connect to respective power conductors of the vertical power busway. In some implementations, the ground conductor busway connector can be wired to the ground bar, the neutral conductor busway connector can be wired to the neutral bus, and the one or more power conductor busway connectors can be connected to respective power conductors of the vertical power busway and are wired to the main switch. The load center can also have a top bracket disposed on a back of the housing near the top of the housing and a bottom bracket disposed on the back of the housing near a bottom of the housing.

The load center can also include one or more junction boxes disposed within the junction box compartment. In some implementations, the housing can be configured to be installed in a utility wall in a space between a utility wall core and one or more finish panels of the utility wall.

The load center can also include an infrared viewing port to permit measuring of infrared energy from the plug-in back plate connection to the vertical power busway. The load center can further include one or more thermal sensors to measure a temperature of a component within the load center or within the vertical power busway, and a processing and communication system coupled to the one or more thermal sensors to receive signals from the one or more sensors and configured to transmit data values representing the signals.

The load center can also include a current monitoring device configured to monitor current of the load center and provide an indication of current use to an external system. The load center can further include circuit breakers that are configured to be individually controllable remotely and to provide an indication of current use by the breaker to a remote system.

Some implementations can include a method. The method can include mounting a plug-in load center on a utility wall panel using a top bracket of the load center and a bottom bracket of the load center, and inserting a plug-in back plate of the plug-in load center to a vertical power busway that extends vertically within an interior of the utility wall panel, wherein each of a plurality of busway connectors within the plug-in back plate are connected to a corresponding conductor of the vertical power busway after the inserting, and wherein each of the plurality of busway connectors are connected to a corresponding connection point within the load center. The method can also include connecting one or more load circuit wiring assemblies to the plug-in load center by joining a connector on each wiring assembly with a respective connector receptacle on the plug-in load center, and wherein the wiring assemblies are connected to one or more corresponding junction boxes installed in corresponding prefabricated wall-panels.

The method can further include energizing the plug-in load center by switching on a main switch of the plug-in load center configured to electrically connect each connection point to one or more circuit breakers within the plug-in load center. The method can also include assembling the plug-in load center in a factory, wherein assembling the plug-in load center in the factory includes wiring each connector receptacle to a corresponding circuit breaker within the plug-in load center.

In some implementations, mounting the plug-in load center, inserting the plug-in back plate, wiring each of the busway connectors, and connecting the one or more load circuit wiring assemblies to the load center are performed at a building construction site. The method can also include installing a utility wall including the utility wall core and the vertical power busway in a building.

The method can also include connecting one or more high amperage load circuits to a corresponding high amperage junction box within the plug-in load center. In some implementations, connecting one or more high amperage load circuits to a corresponding high amperage junction box includes directly wiring the high amperage load circuit to the corresponding high amperage junction box. In some implementations, connecting one or more high amperage load circuits to a corresponding high amperage junction box includes connecting a high amperage load circuit connector to a corresponding high amperage load circuit connector receptacle.

BRIEF DESCRIPTION OF THE DRAWINGS

FIGS. 8A-8B are diagrams showing views of an example load center, in accordance with some implementations.

DETAILED DESCRIPTION

Figure 1:
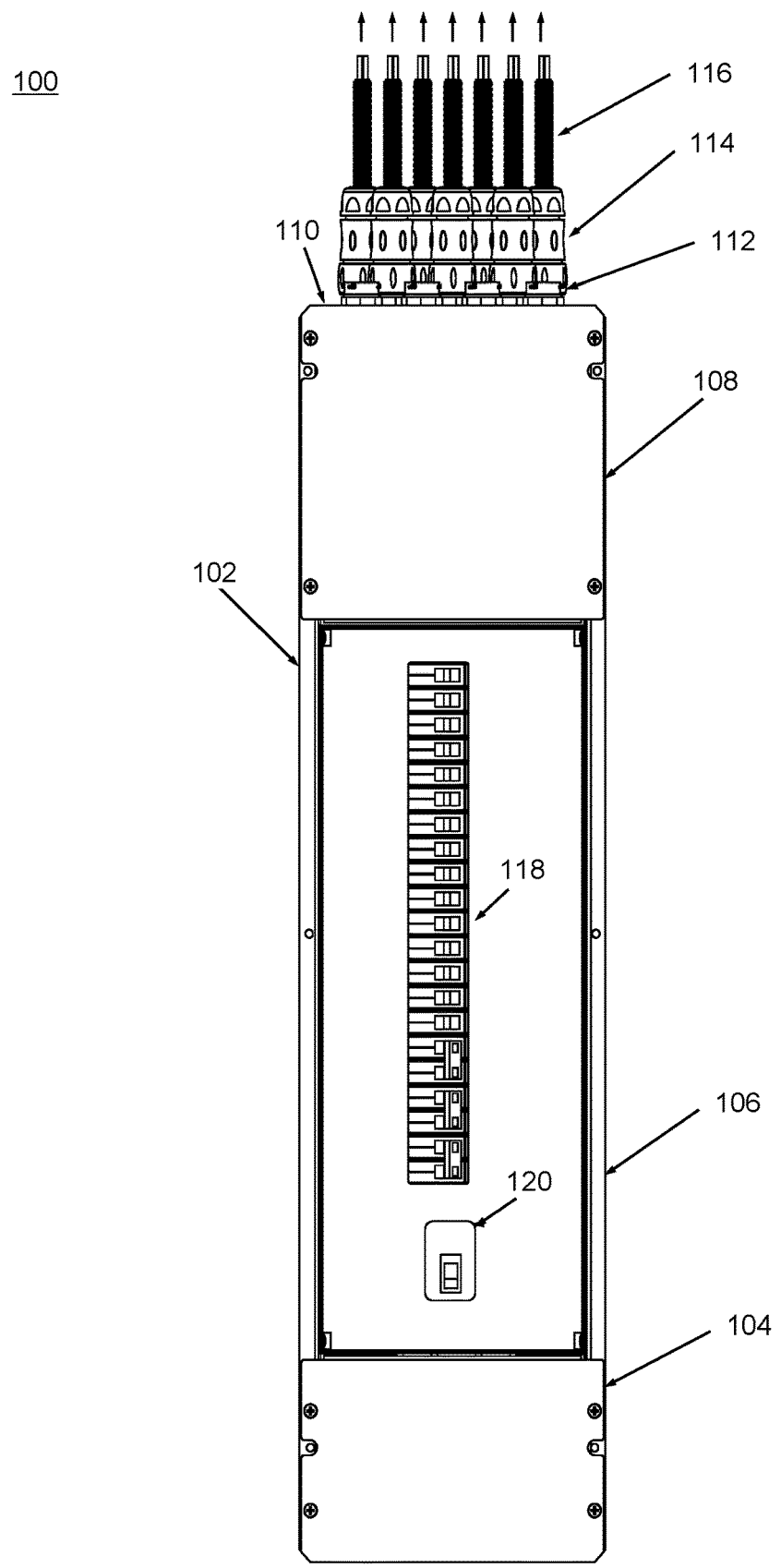
FIG. 1 is a diagram showing a front view of an example load center with the door panel removed, in accordance with some implementations.

FIG. 1 is a diagram showing a front view of an example load center 100 that is compartmentalized. Load center 100 includes a housing 102, a plug-in back plate compartment 104, a breaker compartment 106, and a junction box compartment 108. The load center 100 also includes a housing top 110, one or more connector receptacles 112, one or more load circuit connectors 114, one or more load circuit wiring assemblies 116, one or more circuit breakers 118, and a main switch 120 (or main disconnect).

Figure 3:
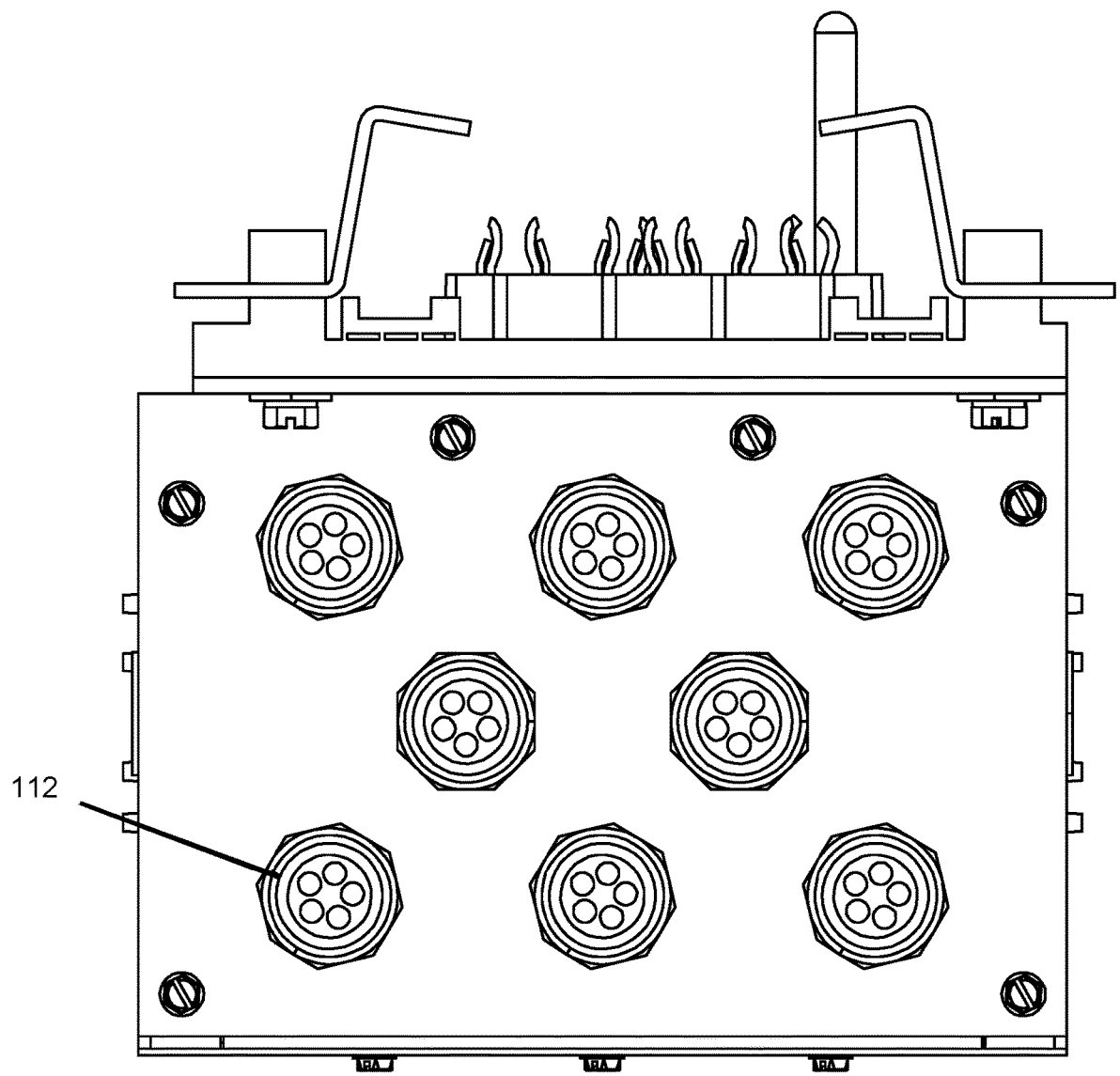
FIG. 3 is a diagram showing a top view of an example load center, in accordance with some implementations.
Figure 4:
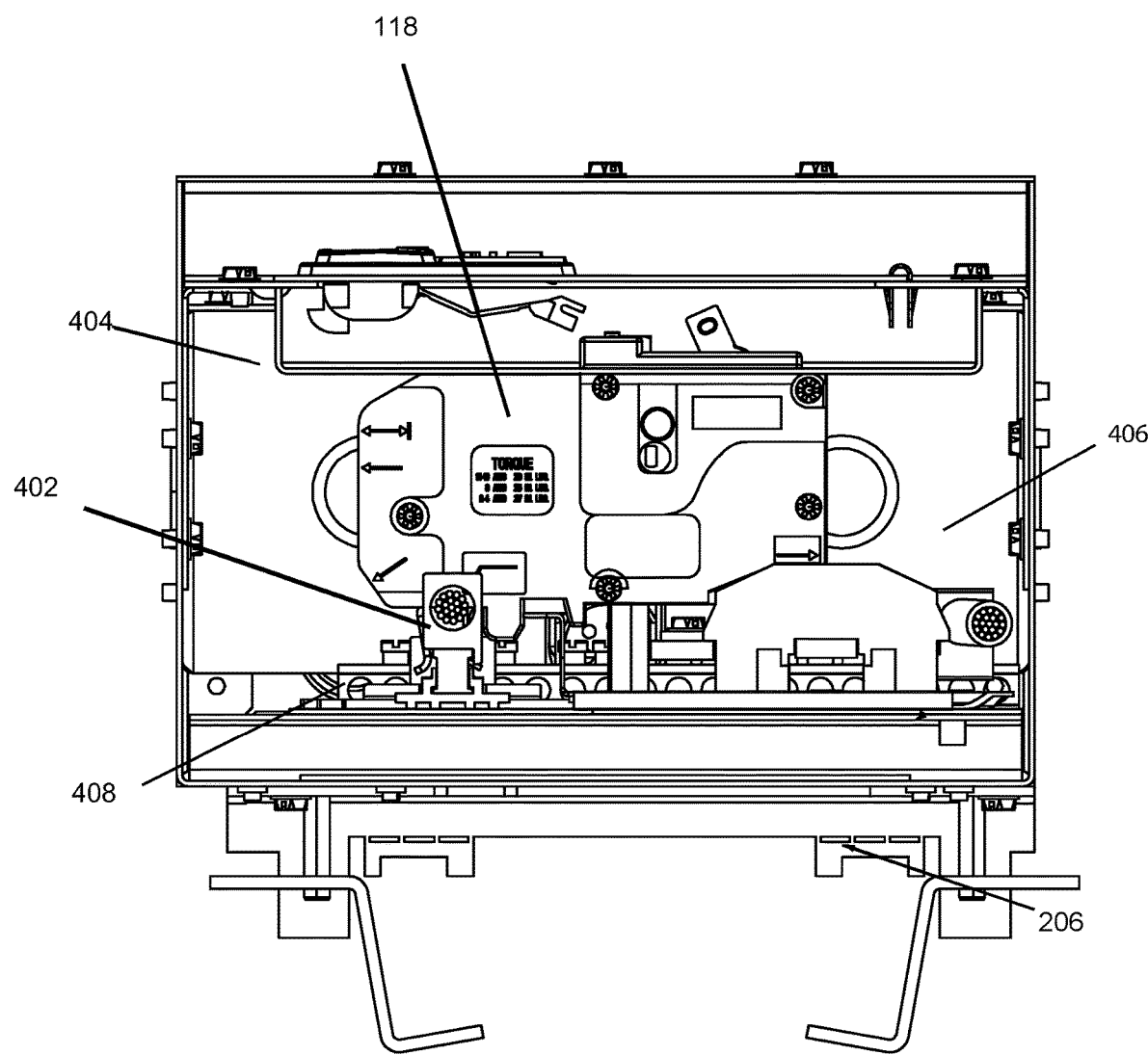
FIG. 4 is a diagram showing a cutaway view of an example load center, in accordance with some implementations.

The plug-in back plate compartment 104 is configured to house a plug-in back plate discussed below in connection with FIGS. 2, 3, 6, and 8B, for example. The breaker compartment 106 is configured to house one or more circuit breakers 118 and the main switch 120. The circuit breakers 118 can include circuit breakers having ground fault protection (e.g., ground fault circuit interruption or GFCI), arc fault protection (e.g., arc fault circuit interruption or AFCI), or both ground fault and arc fault protection. For arc fault protection, each circuit breaker and circuit may need an individual neutral line, this neutral line can be wired to the circuit breaker from the neutral bus, or connected via a circuit breaker that is configured to connect to the neutral bus within the load center in the same manner at the circuit breakers connect to the hot bus within the load center. The junction box compartment 108 is configured to house one or more junction boxes for high amperage circuits (e.g., clothes dryer, kitchen range, etc.) as shown in FIG. 4 and discussed below.

The load center 100 has one or more connector receptacles 112 (or connector sockets) disposed on a top 110 of the housing 102. The connector receptacles 112 are connected to a circuit breaker (e.g., one of circuit breakers 118) within the load center 100. Each connector receptacle 112 includes contacts within the receptacle that correspond to the individual wires for a load circuit (e.g., hot, neutral, ground, etc.) connected to a circuit breaker. The connector receptacles 112 can be wired to respective circuit breakers 118 in a factory where the load center is being assembled (e.g., prior to delivery to and installation in a building at a construction site). A load circuit (e.g., a load circuit for a room or other portion of a building unit) can be wired with a load circuit wiring assembly 116 including a connector 114 configured to mate with a corresponding connector receptacle 112 on the housing 102 of the load center 100. The connectors 114 can include electrical connection members (e.g., electrical contacts) and mechanical connection members (e.g., a threaded connector that mates with a corresponding portion on a receptacle, a rotating locking member that engages a corresponding element on a receptacle, etc.). As used herein the connector (or plug or male) portion and a corresponding connector receptacle (or socket or female portion). The connectors can include circular connectors that may provide water resistance features. The circular connectors can include circular connectors such as those made by Amphenol or the like. The connectors can also include non-circular connectors such as rectangular connectors, or the like. Wires within a load center or load circuit can include solid core wire or stranded wire. Further wires within a load center or load circuit can be flexible (e.g., wires or flexible printed circuit boards) or rigid (e.g., bus bars, rigid printed circuit boards, or the like). The connectors can be single-circuit connectors or multi-circuit connectors. Also, the connectors may be configured for a given amperage rating and used for load circuits having that amperage. The connectors and connector receptacles may be color coded or otherwise labeled with symbols or alphanumeric characters to identify the load circuit that the connector/receptacle are associated with. The connectors and receptacles may also be color coded to indicate single or multi-circuit and/or amperage rating.

For example, when constructing a building using a modular construction technique, a wall panel for use in construing a room within the building can include a wiring assembly 116 with a connector 114 that can be connected to a corresponding connector receptacle 112 of the load center 100. The wiring assembly 116 can be a wiring assembly that is installed in the wall panel in a factory (e.g., a factory where wall panel is manufactured) such that when the wall panel is delivered to a construction site of a building, the wall panel can be installed in the building and the electrical circuit for the wall panel can be connected to the load center (or other intermediate wiring) by simply connecting the connector of the wiring assembly to the load center for that unit or to another intermediate wiring portion that also includes a corresponding connector or connector receptacle.

In some implementations, the connectors may be constructed and approved for connection by a person other than a licensed electrician. Thus, by providing load circuit wiring assemblies with such connectors within wall panels, ceiling panels, floor panels, or other portions of a modular construction building, significant labor savings may be obtained by reducing a need for licensed electricians to perform electrical wiring or connection tasks. Further, by providing walls panels, ceiling panels, floor panels, or other portions of the building with prewired wiring assemblies with connectors, the amount of time needed to connect electrical wiring at the construction site can be reduced compared to site built construction techniques.

In some implementations, the connectors and other electrical components may be rated by a rating or certification agency such as an electrical safety rating organization, a fire safety rating organization, or other rating organization. By having wall, ceiling, or floor panels that include wiring assemblies constructed from components that have been rated or certified by a rating or certification agency, the entire electrical system within a unit of the building, and, in turn, the electrical system of the entire building may be partially or fully rated or certified when built and may avoid a need for some additional inspections or certifications, or may qualify for discounted insurance rates, lower inspection costs, etc. based on the rating or certification of the electrical system, which can include a load center and vertical power busway as described herein. Also, by providing a connectorized electrical system within units of a building, maintenance or upgrade costs can be reduced because the connectorized system permits the components to be replaced or changed out for upgraded components with less cost and labor than conventional manually wired electrical systems. Some implementations permit a building to be "future proofed" or less impacted by changes in technology. By providing for connectorized components in the electrical system that can be changed out by personnel other than electricians with relative ease, the system and methods described herein provide load centers and electrical systems that can be readily adapted to future technology changes without requiring expensive manual rewiring as is often required with conventional wiring.

By providing receptacles 112 (or sockets) to mate with connectors 114 of load circuit wiring assemblies 116, the load center 100 overcomes one of the main problems or limitations of conventional load centers in that with some conventional load centers, each load circuit may need to be manually wired to a circuit breaker within the load center. In some implementations, the circuit breakers are configured to be plugged into the load center and connect with power, neutral, or ground buses within the load center without requiring manual wiring. Manual wiring can include mechanically connecting wires (e.g., using a wire nut), connecting wires to a terminal block, soldering wires, or the like. As used herein, manual wiring refers to wiring connections made without using a connector system have a plug and socket.

Figure 2:
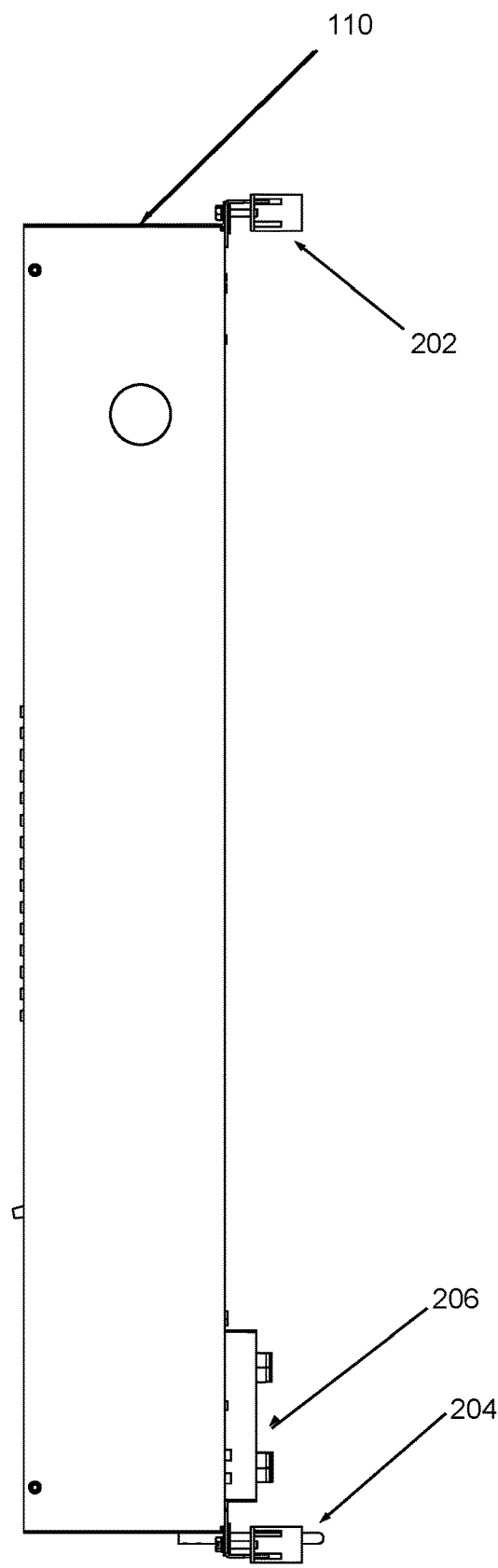
FIG. 2 is a diagram showing a side view of an example load center, in accordance with some implementations.

FIG. 2 is a diagram showing a side view of an example load center 100, in accordance with some implementations. The load center 100 includes a top mounting bracket 202, a bottom mounting bracket 204, and a plug-in back plate 206. The top mounting bracket 202 and bottom mounting bracket 204 are used to secure the load center to the vertical power busway (see, FIG. 13). The plug-in back plate 206 includes one or more connectors (e.g., compression connectors as shown in FIG. 3) to connect to corresponding bars within the vertical power busway. The plug-in back plate 206 is constructed to permit the plug-in back plate 206 to simply be inserted into a vertical power busway and engage the power distribution bars within the vertical power busway via the compression connectors or other suitable busway bar connectors. The vertical power busway conductor connectors mechanically and electrically engage respective conductors of the vertical power busway. The plug-in back plate 206 is shown in greater detail in FIG. 17 and is described below. In some implementations, the load center and/or vertical power busway can include an infrared (IR) viewing port to inspect the connections between a load center and the vertical power busway, or between section of the vertical power busway to make sure the connections or busway conductors are not overheating, which can indicate a loose connection that needs to be serviced. In some implementations, thermal sensors (e.g., thermocouples) can be provided to measure the temperature of one or more components within the load center or vertical power busway. The thermal sensors can be connected to a monitoring system that can receive signals from the thermal sensors and transmit data representing the signals to an external system, such as a monitoring system.

In some implementations, a current monitoring device (e.g., a current measuring transformer) can be provided in each load center to monitor the current used by that load center. The current usage measurement signal can be sent to a system for monitoring power use in the unit in which the load center is installed or can be transmitted to a central system to monitor the units within a building.

Some implementations can include circuit breakers can be individually controlled wirelessly (e.g., via Wi-Fi) or via wired system for load shedding to otherwise permit circuits to be on or off according to one or more criteria (e.g., total load being used by a unit, floor or building, current time of day and/or current day of the week). In some implementations, the individually controlled circuit breakers may be used for high amperage circuits.

For example, by using a control system having a processor and software instructions stored in a nontransitory computer readable medium, the processor can execute the instructions to perform operations including monitoring one or more of total load being used by a unit, floor or building, current time of day and/or current day of the week. If the processor, according to programming logic determines that a parameter meets a logic condition or exceeds a threshold, the processor can be operative to control one or more individually controllable circuit breakers to temporarily turn off one or more breakers to reduce the load. For example, if a load center has an 80 amp main disconnect, but the total load if each circuit was operating at maximum capacity would be 125 amps, the controller can be used to monitor the current flow in the load center and perform load shedding (e.g., by turning off individual circuit breakers) when the current reaches a given threshold (e.g., 70 amps) to keep the overall current from exceeding the main disconnect limit (e.g., 80 amps). In addition to controlling for maintaining a load below a given threshold, the controller can also perform load shedding based on cost factors for electricity (e.g., such as time of day or day of week to reduce the amount of electricity being used during peak times and permit more electricity to be used during off-peak times). By using a control system as described above to limit the total load used by a unit (or floor or building), the amperage requirement for the vertical power busway and load center main disconnect can be reduced (e.g., from a 125-amp system to an 80 amp system). This reduction can permit the power distribution components (e.g., the vertical power busway and/or load centers) to be sized to the lower power requirement (e.g., 80 amp), thus saving cost (e.g., by reducing material needed for the busway conductors) and space within the building (e.g., by reducing the size of the busway raceway needed and/or reducing or eliminating a need for distribution rooms within the building). Using a system described above, the vertical power busway and load center can be sized to a load limit (e.g., 80 amps) that is maintained by a control system such as that described above. The control can be performed on a unit by unit basis, a floor by floor basis or other subdivision of a building, or on a whole building basis.

In addition to using load shedding circuit breakers and a control system as described above, other techniques can be used to reduce the maximum load needed by any given load circuit or the main disconnect. For example, multiple circuits can be used to supply the range/oven (e.g., one circuit for the range top and a second circuit for the oven).

The combination of the mounting brackets (202 and 204) and the plug-in back plate 206 enables the load center 100 to be attached to a vertical power busway of a power distribution system of a building with relative ease compared with some conventional load centers and power distribution systems. For example, the load center 100 can be simply inserted into openings in a wall and secured with minimal processes required for the physical connection of the load center to the wall and the electrical connection of the load center to the vertical power busway.

FIG. 3 is a diagram showing a top view of an example load center 100, in accordance with some implementations. In FIG. 3, the top of the plug-in back plate 206 is visible, along with a top view of connector receptacles 112 and connectors 114 (also showing a top view of a cut away end of wiring assemblies 116 atop the connectors 114).

FIG. 4 is a diagram showing a cutaway view of an example load center 100, in accordance with some implementations. In particular, FIG. 4 shows a neutral bus 402 for distributing the neutral connection within the load center 100, a first high amperage junction box 404 (e.g., a 50 amp junction box for a range, etc.), a second high amperage junction box 406 (e.g., a 30 amp junction box for a dryer, etc.), and a ground bar 408 for distributing a ground connection within the load center 100. The junction boxes 404 and 406 can be used to provide power to respective load circuits (e.g., high amperage load circuits) such as the load circuit for a clothes dryer or the load circuit for a kitchen range or oven. In some implementations, the high amperage circuits can be directly wired to the junction boxes. The wiring of the high amperage wiring assemblies to a respective junction box may be performed by an electrician. These connections may be some of the few, if not only, connection tasks that may need to be performed by a licensed electrician in some areas in order to install and connect a load center in accordance with the disclosed subject matter. In some implementations, a high amperage wiring assembly can include a connector that can connect to a corresponding connector receptacle connected to a respective junction box. In an implementation in which the high amperage wiring assemblies include connectors, the connection of the high amperage wiring assemblies may not be required to be performed by a licensed electrician.

Figure 5:
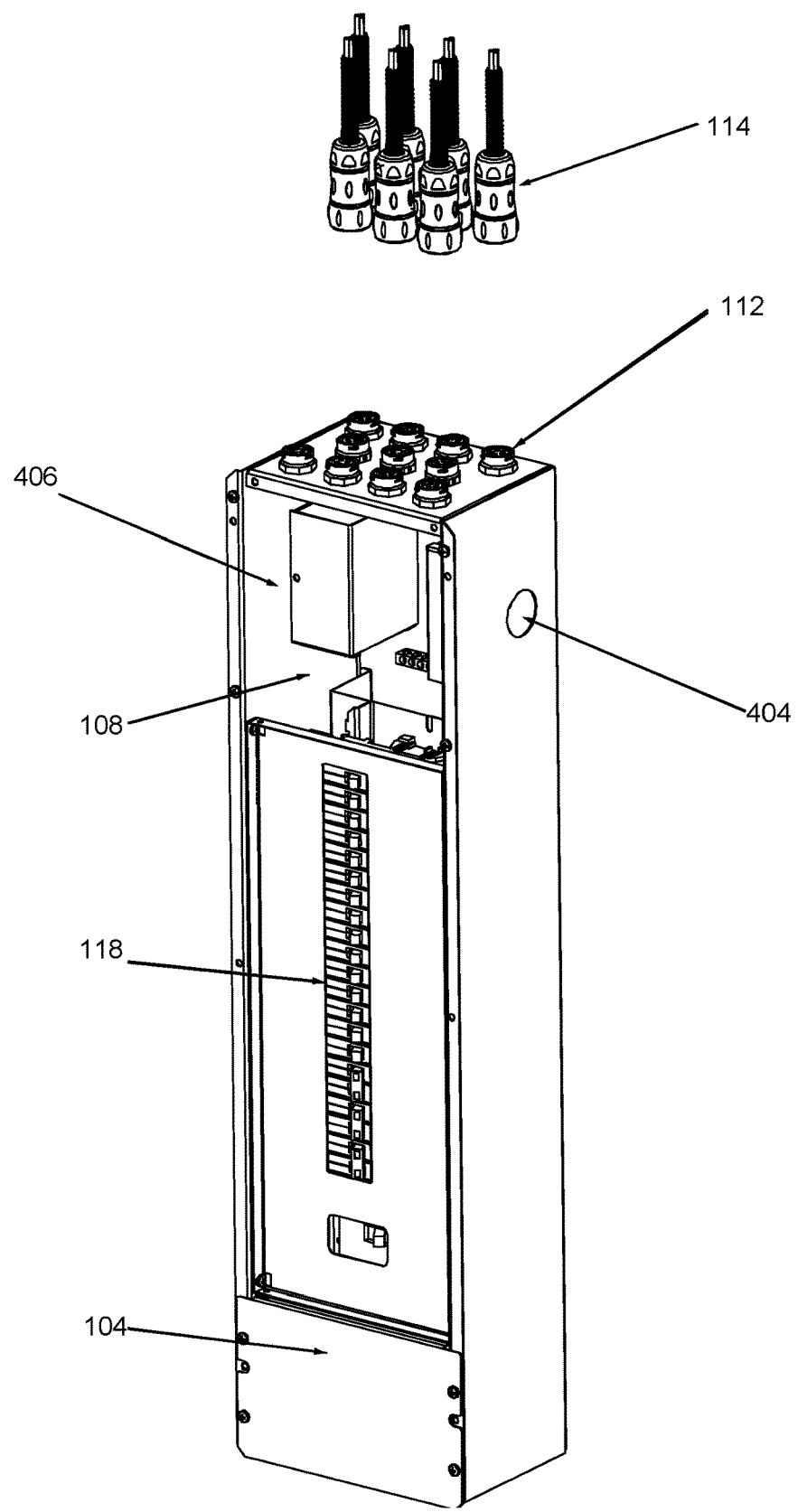
FIG. 5 is a diagram showing a view of an example load center with junction box access panel or top access panel removed, in accordance with some implementations.

FIG. 5 is a diagram showing a view of an example load center 100 with access panels removed and connectors disconnected. With the junction box compartment access panel removed, the high amperage junction boxes 404 and 406 within the junction box compartment 108 are visible.

Figure 6:
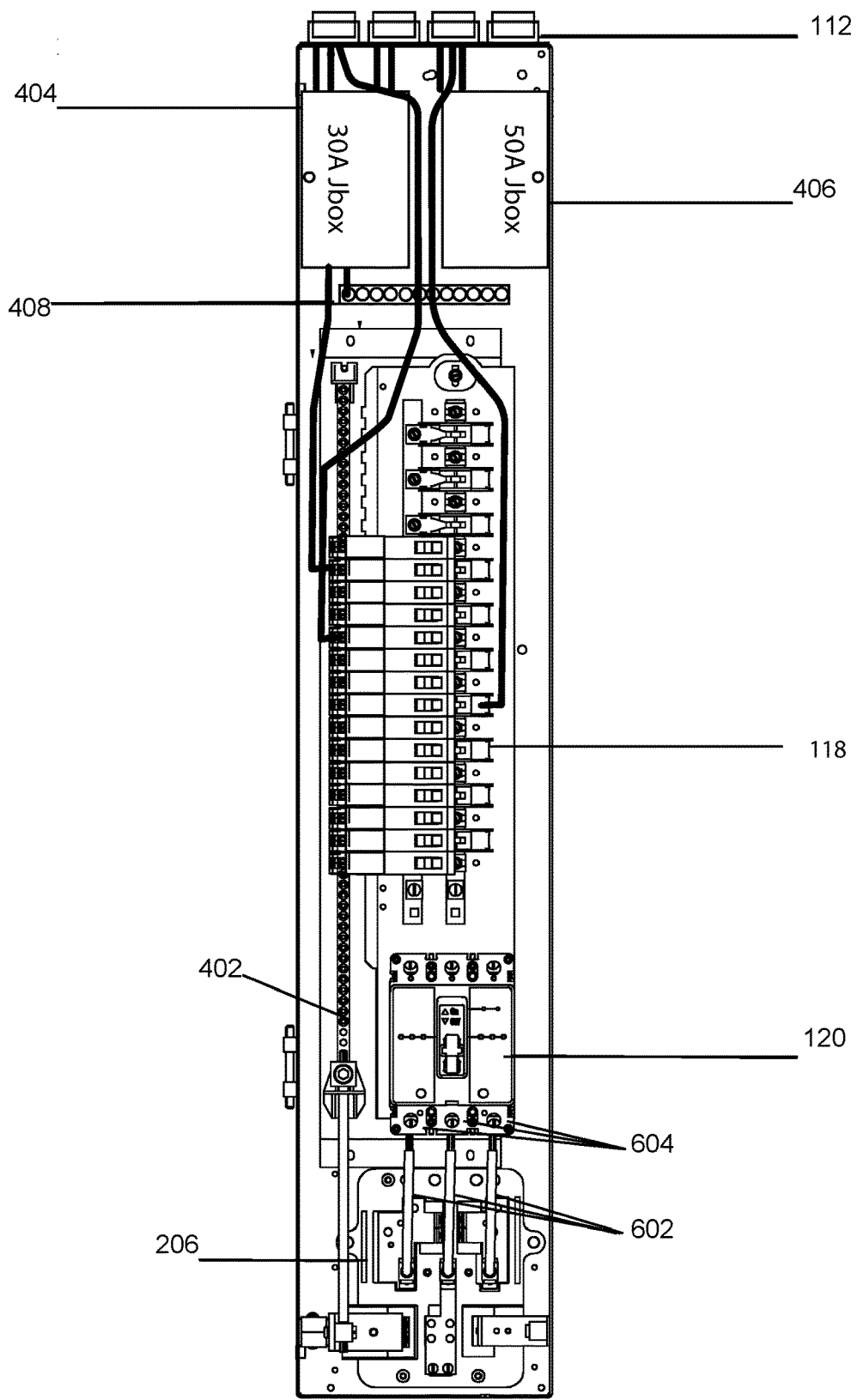
FIG. 6 is a diagram showing an inside view of an example load center, in accordance with some implementations.

FIG. 6 is a diagram showing an inside view of an example load center 100, in accordance with some implementations. In FIG. 6, the vertical arrangement of load center components is shown starting with connector receptacles 112 disposed on the top of the load center housing. The high amperage junction boxes 404 and 406 are shown installed in the junction box compartment 108 above the ground bar 408. A plurality of circuit breakers 118 are shown alongside the neutral bus 402, which is wired to the plug-in back plate 206.

In FIG. 6, the main switch 120 is shown wired to the plug-in back plate 206. Once the load center has been installed in a wall or wall panel and the plug-in back plate 206 has been connected to the vertical power busway of the building, a connection between the plug-in back plate 206 and the corresponding portions of the load center is made so that the load center can be energized by power from the vertical power busway. In some implementations, the electrical connections between the plug-in back plate and the load center may wired in a factory setting. In some implementations, the electrical connections between the plug-in back plate and the load center can be made on site in a building and may be one of the few connection tasks that may need to be performed by a licensed electrician in some areas in order to install a load center in accordance with the disclosed subject matter. Each busway bar connector in the plug-in back plate includes a wire terminal or connection point to which a wire can be connected. The wire can then be connected to a corresponding terminal or connection point within the load center. For example, the ground connector of the plug-in back plate 206 can be wired to the ground of the load center 408, the neutral connector of the plug-in back plate 206 can be wired to the neutral bus 402 of the load center, and one or more power lines can be wired (e.g., via wires 602) from the plug-in back plate 206 to corresponding terminals (604) within the load center (e.g., on the main switch 120).

Figure 7A:
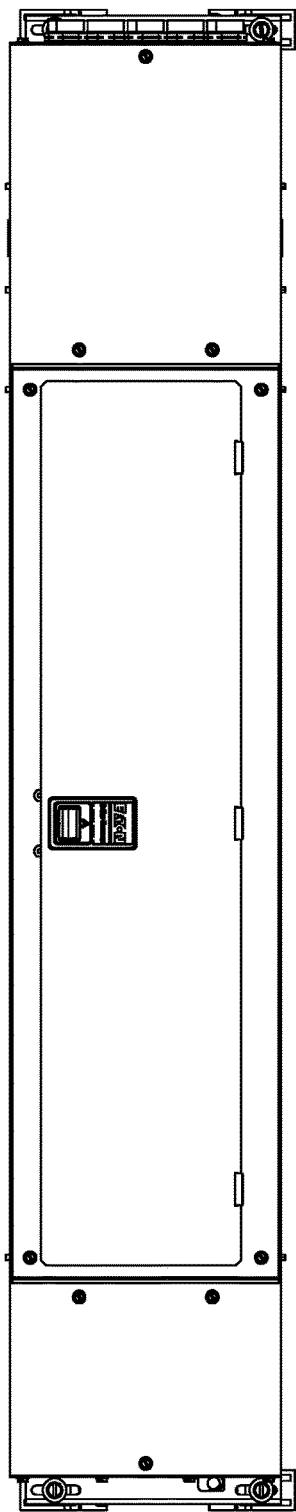
FIGS. 7A-7C are diagrams showing front views of an example load center with various access cover configurations, in accordance with some implementations.
Figure 7B:
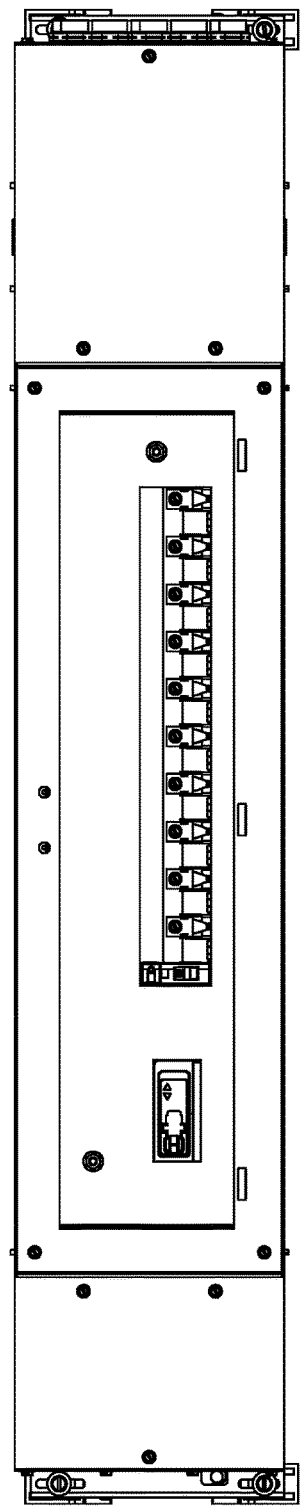
Figure 7C:
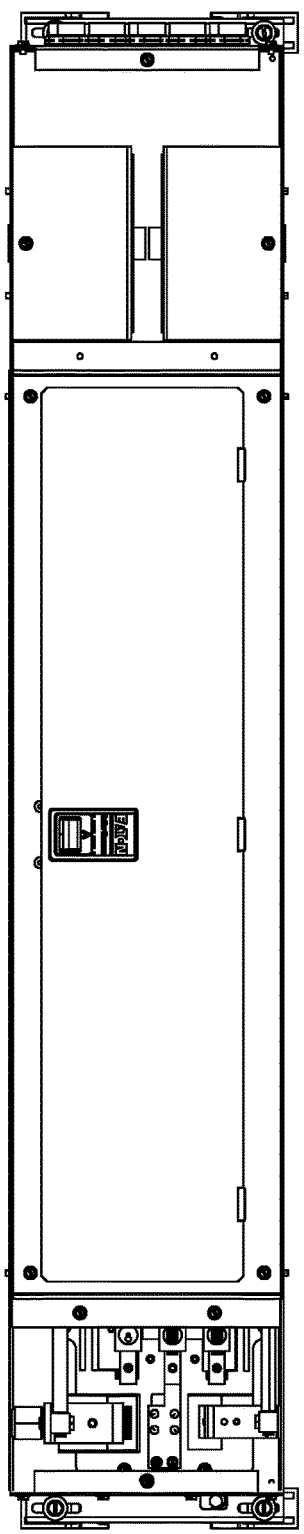

FIGS. 7A-7C are diagrams showing front views of an example load center with various access cover configurations, in accordance with some implementations. FIG. 7A shows the load center 100 with breaker access door and other access panels closed. FIG. 7B shows the load center 100 with breaker access door open and other access panels closed. FIG. 7C shows the load center 100 with breaker access door open and junction box compartment access panel open.

FIGS. 8A-8B are diagrams showing views of an example load center 100 showing the top and bottom locking brackets 202 and 204, and the plug-in back plate 206.

Figure 9:
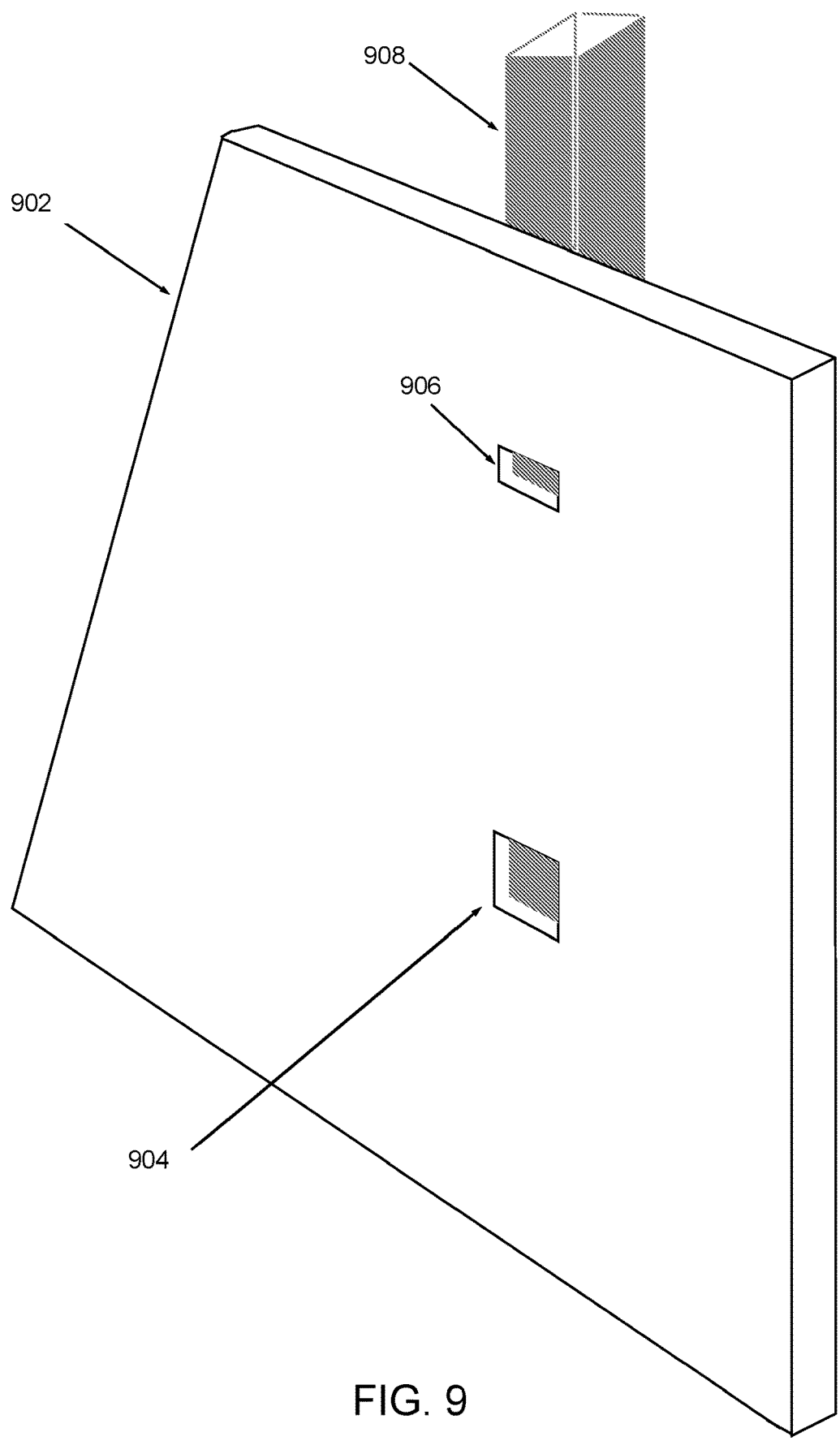
FIG. 9 is a diagram of an example utility wall configured to mount a load center, in accordance with some implementations.

FIG. 9 is a diagram of an example utility wall 900 having a utility wall core 902 configured for a load center 100 to be mounted on the utility wall core 902, in accordance with some implementations. The utility wall 900 can include a multi-story (e.g., two-story) wall panel forming part of a building constructed using a modular construction technique. Some implementations can include a single-story wall panel and a wall panel extending more than one story. The utility wall core 902 can include a first opening 904 and a second opening 906 that are configured to receive top and bottom brackets of the load center 100 and the plug-in back plate 206. The utility wall 900 can also include a vertical power busway 908 that can be disposed within the utility wall core 902 or external to the utility wall core 902. The vertical power busway 908 can include one or more conductors (e.g., five conductors, one each for neutral, ground and three phase power) that extend throughout the length of the vertical power busway 908. An advantage of the vertical power busway 908 over conventional feeder lines or horizontal busways, is that the vertical busway 908 can take up a relatively small area within a wall and does not increase much in size when going to a higher amperage. Another advantage of the vertical power busway is that sections of the busway can be connected as wall panels are installed (e.g., when a higher wall panel containing a vertical power busway is installed on a lower panel containing a vertical power busway, the vertical power busway sections connect to each other at a junction point. This connection significantly reduces the complexity of power distribution within a building both in terms of materials and time as compared to conventional site-built electrical distribution and wiring systems.

Figure 10:
FIGS. 10-12 are diagrams of a multi-story building configured to mount load centers, in accordance with some implementations.
Figure 11:
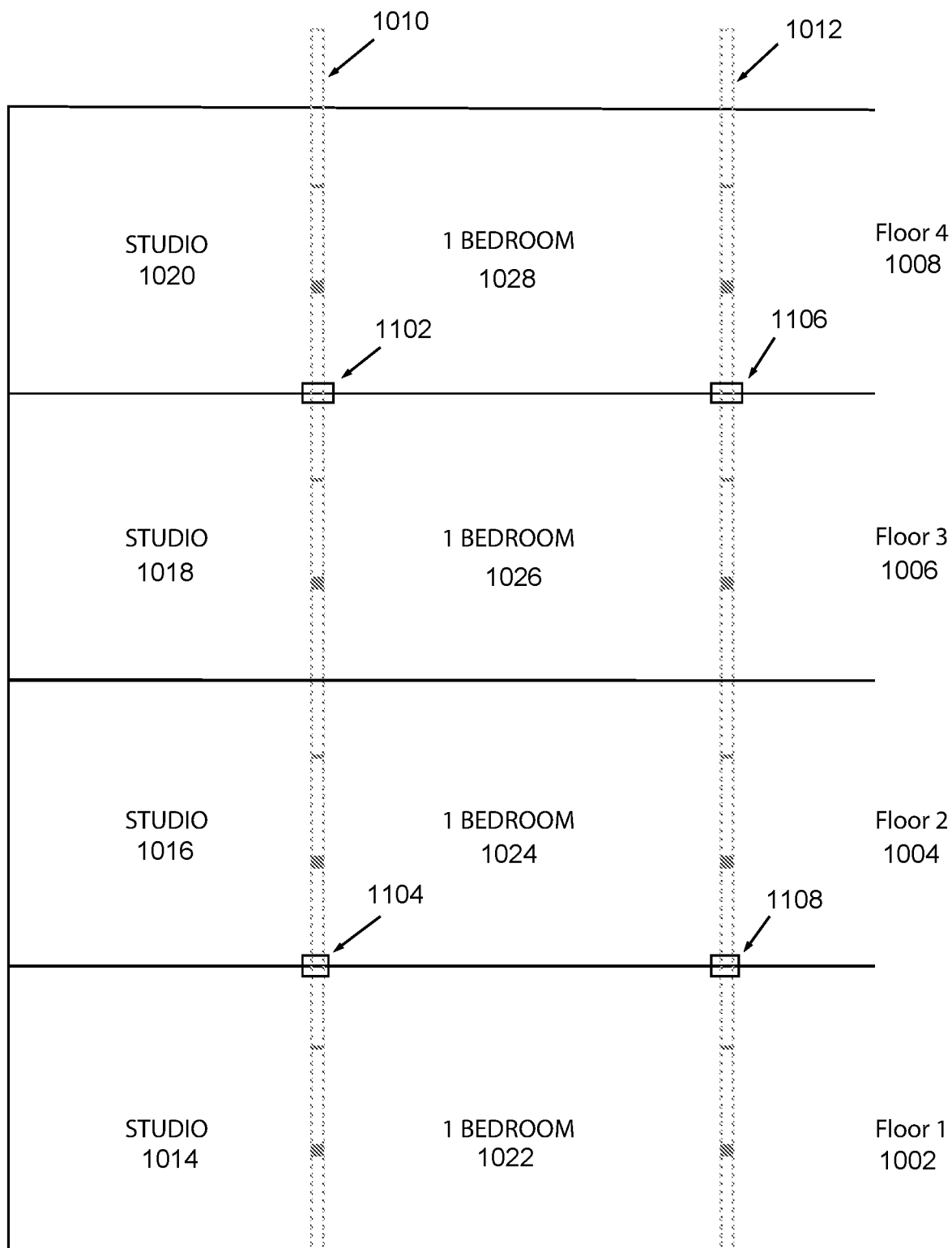
Figure 12:
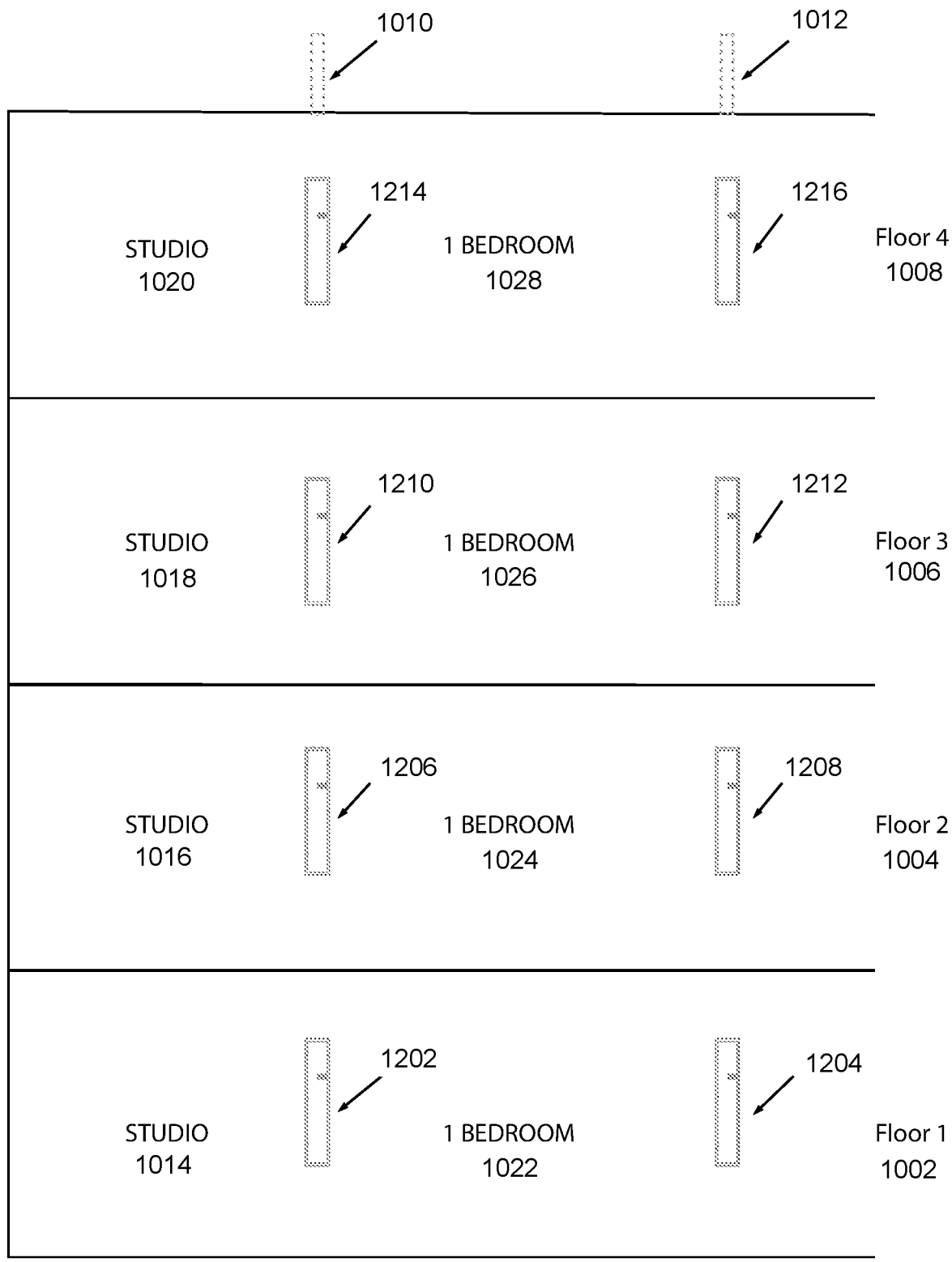

FIGS. 10-12 are diagrams of a multi-story building configured for load centers, in accordance with some implementations. As shown in FIGS. 10-12, a portion of a multi-story building shown including a first floor 1002, a second floor 1004, a third floor 1006, and a fourth floor 1006. Also shown are two vertical power busways 1010 and 1012. Floors 1-4 each include a studio unit 1014-1020, respectively, and a one-bedroom unit 1022-1028, respectively. One of the vertical power busways (1010) provides power to the studio units 1014-1020, and the other vertical power busway (1012) supplies power to the one-bedroom units 1022-1028.

In some implementations, the vertical power busways 1010 and 1012 can be formed from sections that extend vertically for more than one floor and connect with a section above and below. For example, as shown in FIG. 11, the vertical power busways 1010 and 1012 each include a section that extends from a top of floor 1 to a bottom of floor 4 and provides power to floors 2 and 3. Sections of the busway below floor 2 provide power to floor 1 and the section above floor 3 provides power to floor 4. These sections of the vertical power busways are connected to the other sections of the vertical power busways at the connection points indicated by 1102-1108.

FIG. 12 shows the first-floor load centers 1202 and 1204, the second-floor load centers 1206 and 1208, the third-floor load centers 1210 and 1212, and the fourth-floor load centers 1214 and 1216 installed in the building.

Figure 13:
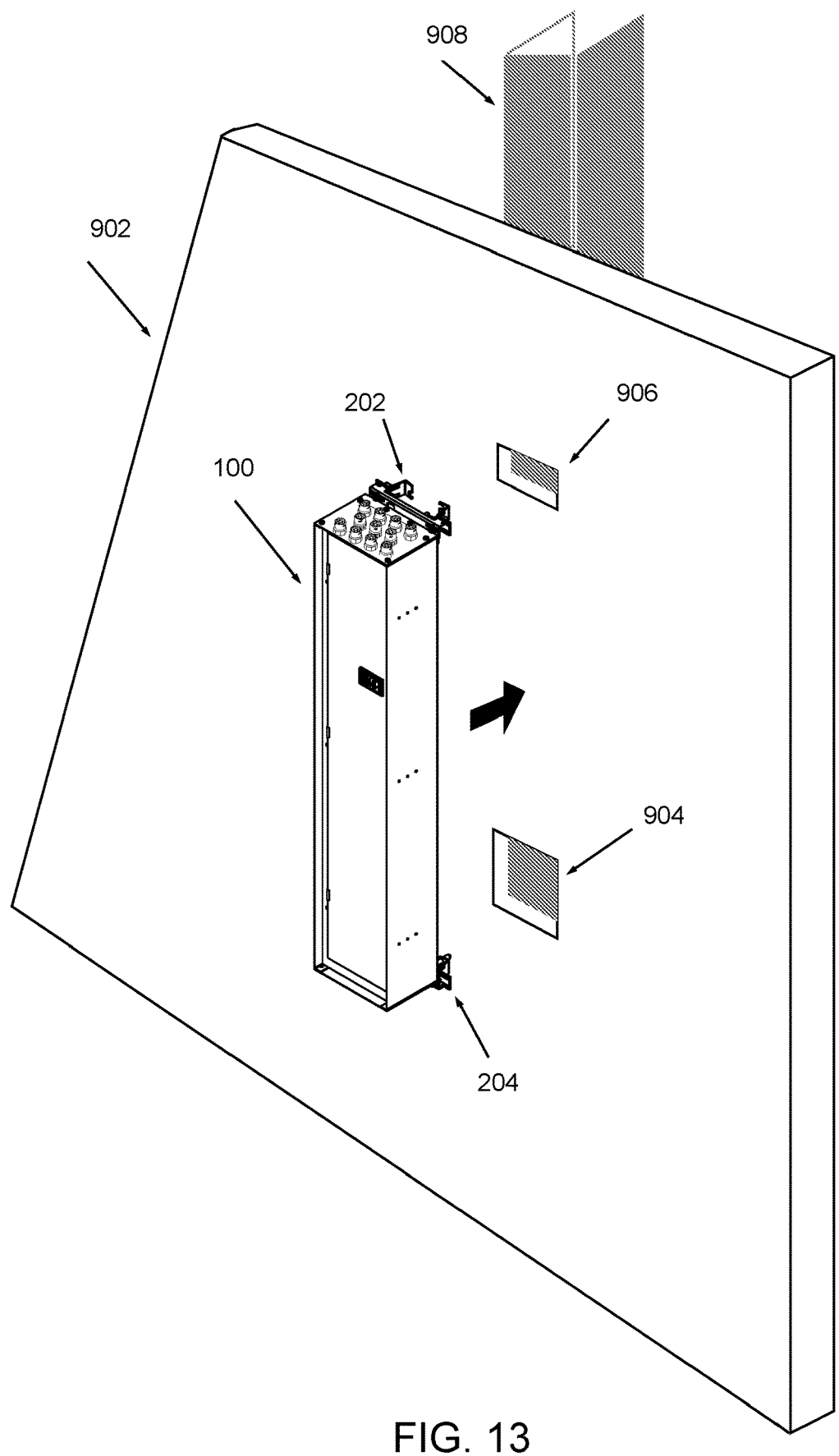
FIGS. 13-16 are diagrams showing an installation sequence of a load center, in accordance with some implementations.

FIGS. 13-16 are diagrams showing an installation sequence of a load center, in accordance with some implementations. FIG. 13 shows a load center 100 being positioned for installation on the utility wall core 902, where the top bracket 202 is positioned to fit into opening 906, and the bottom bracket 204 is positioned to fit into opening 904. The plug-in back plate 206 (not visible in FIG. 13) is also positioned to fit into opening 904 and connect to the vertical power busway 908.

Figure 14:
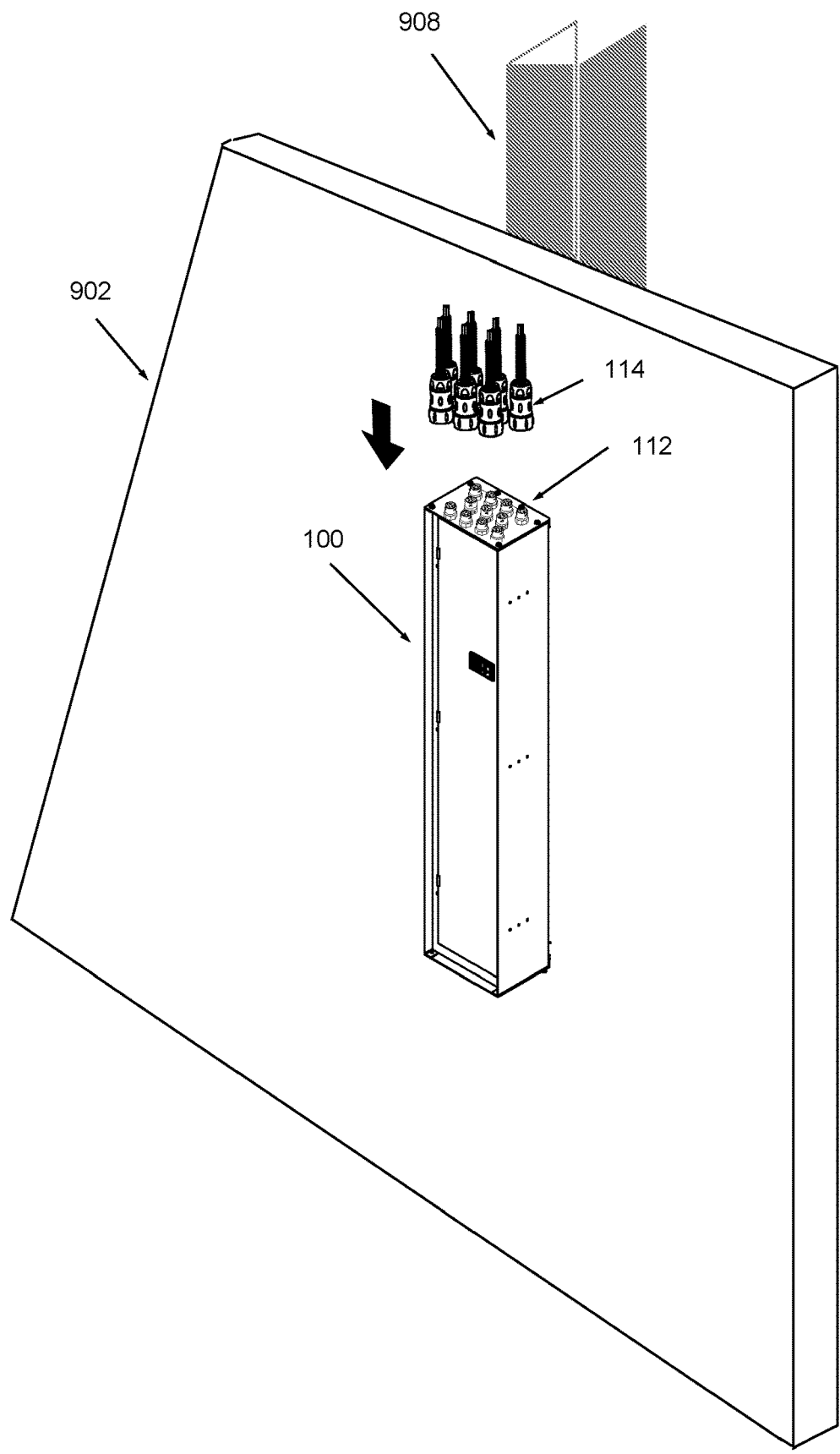
Figure 15:
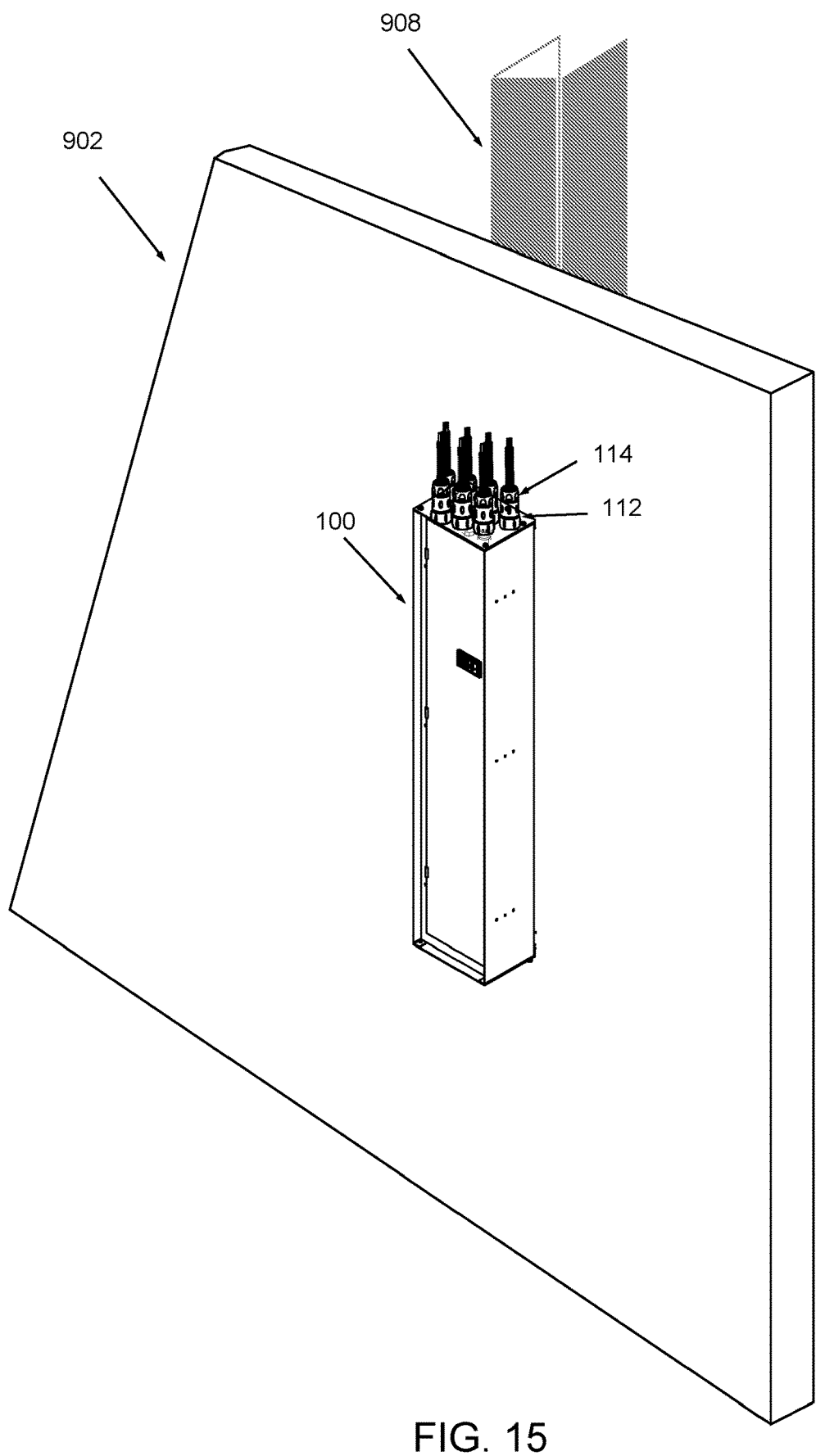

FIG. 14 shows the load center 100 in place with load circuit wiring assemblies and corresponding connectors 114 in position to be connected to the load center receptacles 112. FIG. 15 shows the connectors 114 connected to the receptacles 112. For example, the connectors 114 can be connected to the receptacles 112 at a building construction site.

Figure 16:
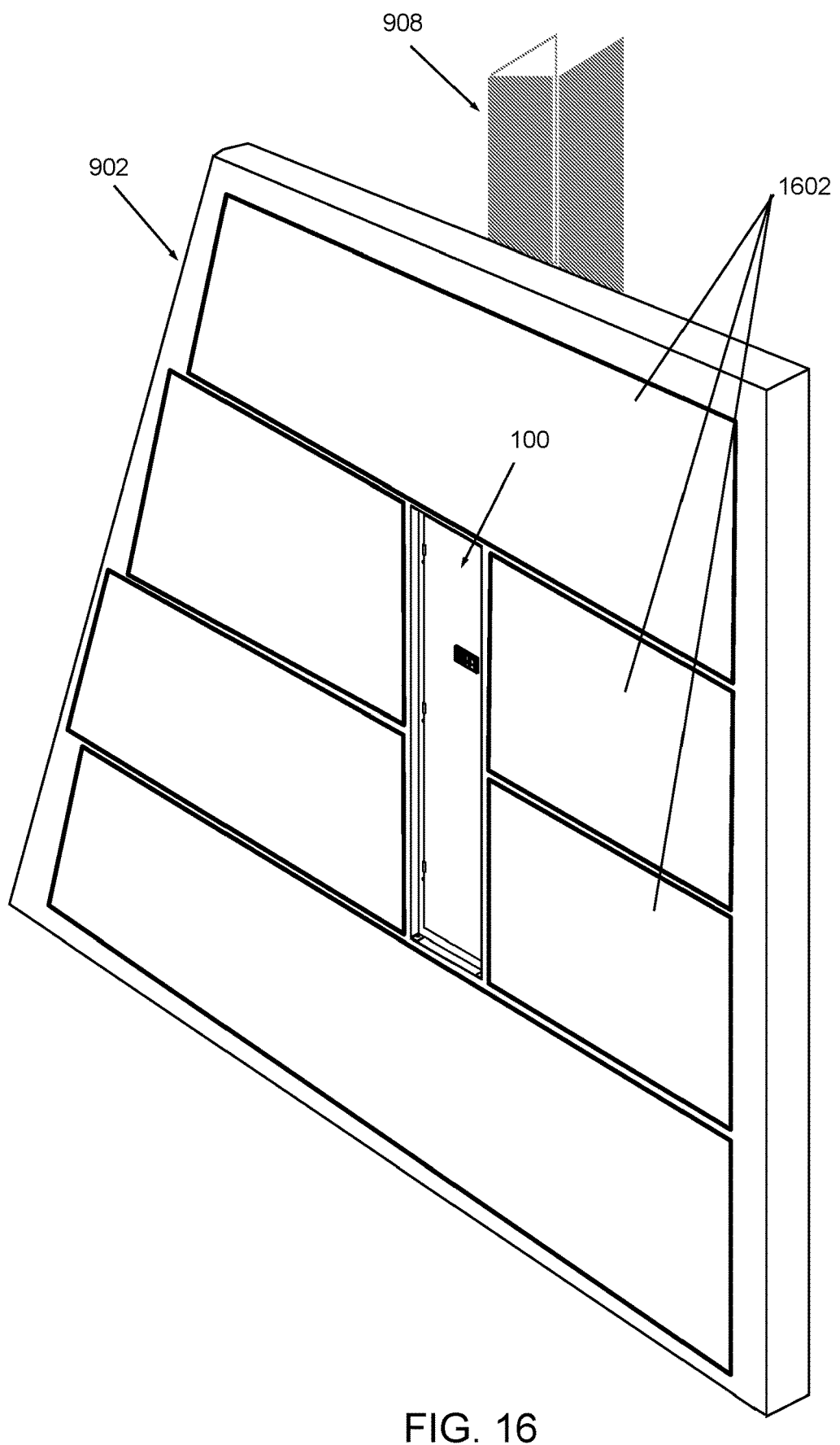

FIG. 16 shows finish panels 1602 installed on the utility wall core 902 to be flush with the front of the load center 100. Housing 102 of the load center 100 can be constructed to fit within a space between the utility wall core 902 and the finish panels when the finish panels are installed on the utility wall core 902.

Figure 17A:
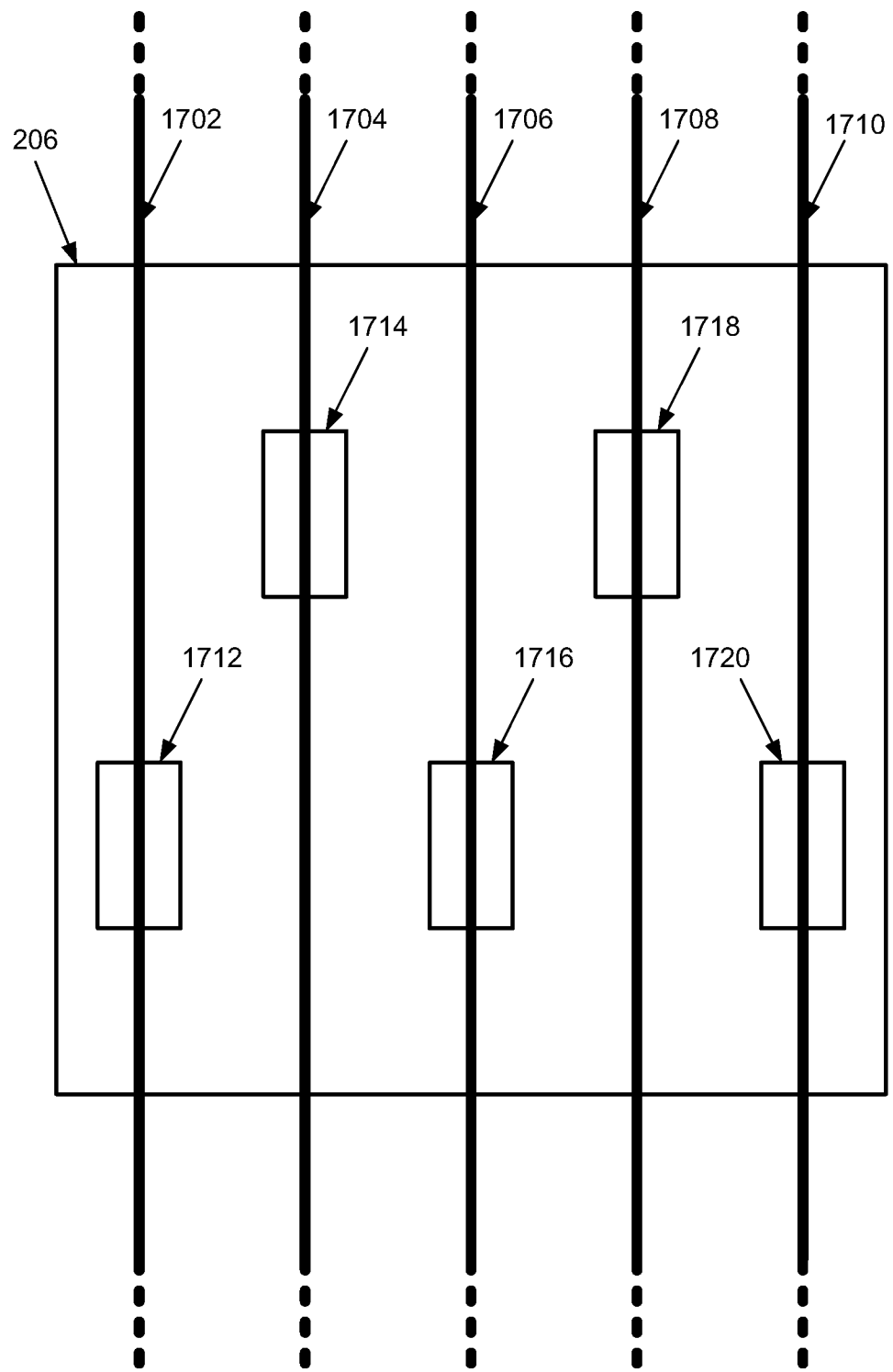
FIG. 17A is a diagram showing details of an example plug-in back plate connected to a vertical power busway with AC conductors, in accordance with some implementations.

FIG. 17A is a diagram showing details of an example plug-in back plate 206 and AC conductors of vertical power busway 908. In the example shown in FIG. 17, the vertical power busway includes five conductor bars 1702-1710, which can include, for example, a ground conductor, a neutral conductor, and three power conductors (e.g., for three-phase power). The plug-in back plate 206 is shown with a plurality of busway connectors 1712-1720 (e.g., bus bar compression connectors or any suitable busway conductor connectors) connected to corresponding busway conductor bars 1702-1710.

Figure 17B:
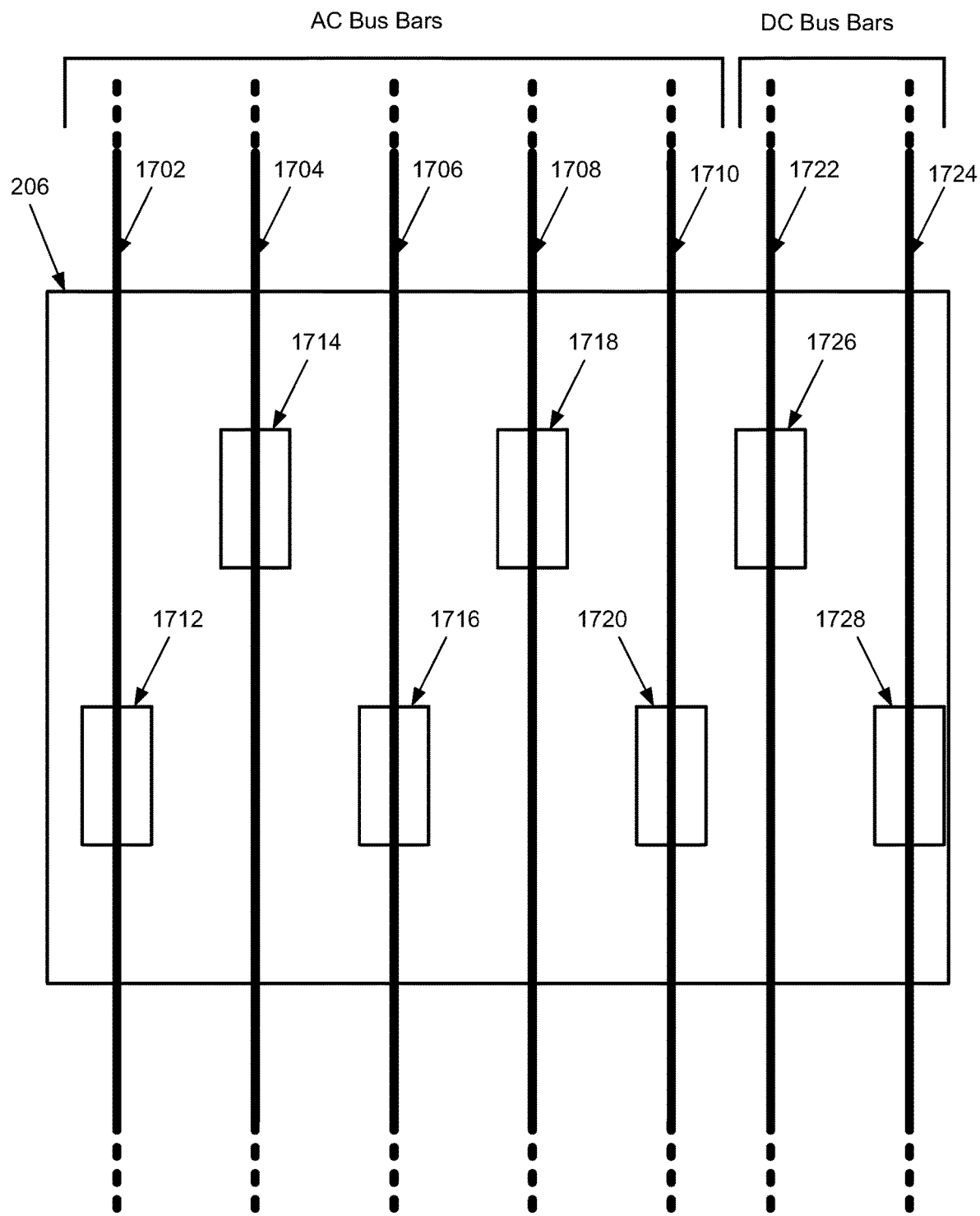
FIG. 17B is a diagram showing details of an example plug-in back plate connected to a vertical power busway with AC and DC conductors, in accordance with some implementations.

FIG. 17B shows the vertical power busway including the AC conductor bars 1702-1710 and DC conductor bars 1722 and 1724. Also shown are DC busway connectors 1726 and 1728 that connect the plug-in back plate to the DC busway conductor bars. The DC busway conductor bars can be used to provide DC power (e.g., low voltage DC power) to units within a building via a load center. DC power may be supplied by a solar electric system including solar electric panels (e.g., mounted on a roof of the building) and one or more batteries. The DC power from the solar panels can be distributed on the DC conductor bars and can be stored in the batteries within the building. The batteries may be connected to the conductor bus bars via battery charge controllers. The DC power can be supplied to load centers for use in units within the building for powering DC refrigerators, fans, window shades, DC lighting, and the like. Load centers having DC capability may have circuit breakers for DC load circuits and/or circuit breakers for AC load circuits. In order to accommodate the DC conductor bars, the vertical busway can be made wider. This permits the vertical busway to have additional conductors without increasing the depth of the vertical busway within the wall. The vertical power busway and load center may also be configured to receive power in the form of AC power, DC power, digital DC power (such as that provided by systems from VoltServer), power over Ethernet (POE), or the like. In general, any electrical power format can be distributed and provided to a unit within a building via a vertical power busway and load center as described herein.

Figure 18:
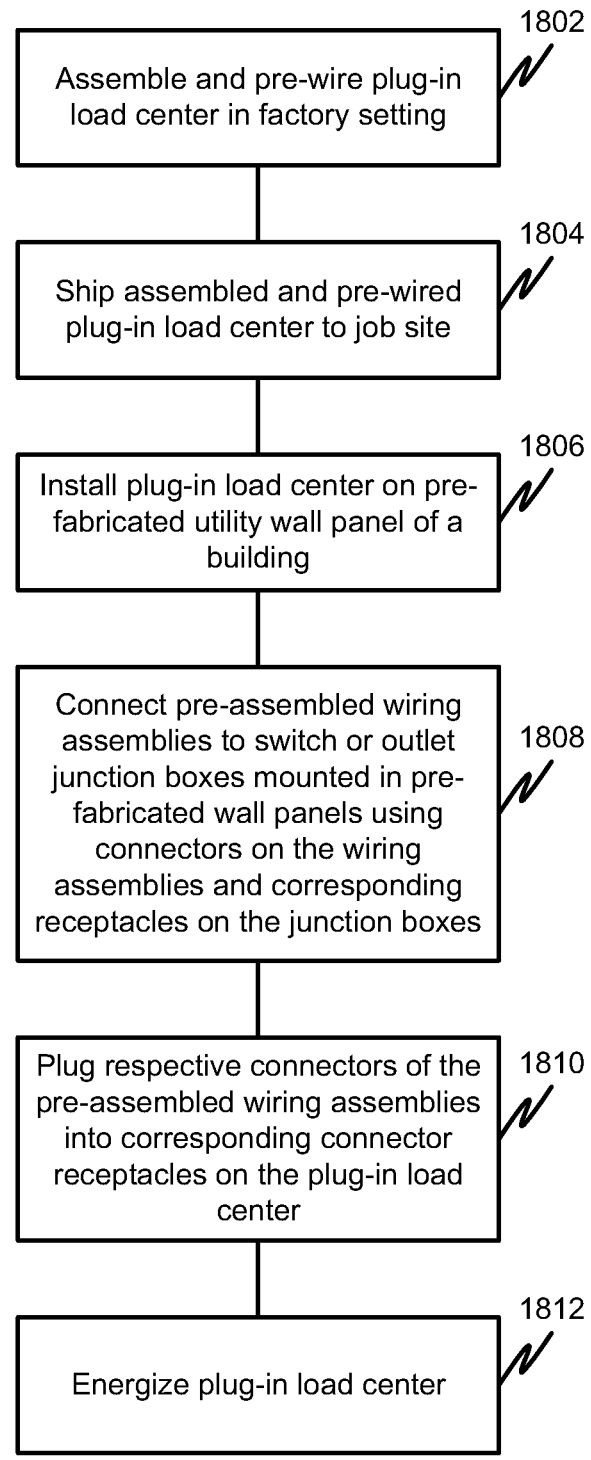
FIG. 18 is flowchart of an example method to build and install a plug-in load center in building having prefabricated wall panels in accordance with some implementations.

FIG. 18 is flowchart of an example method to build and install a plug-in load center in a building having prefabricated wall panels in accordance with some implementations. The method can also be used for conventional (non-prefabricated) new construction buildings or remodeling or retrofitting of a conventional building with or without prefabricated components. Modular prefabricated construction is discussed here for purposes of illustrating the disclosed subject matter and is not intended to be limiting.

The method begins at 1802, where a plug-in load center is assembled and pre-wired. The assembly and pre-wiring can include installing a plug-in back plate, a main switch, and power and bus bars inside the plug-in load center. The assembly and pre-wiring can also include connecting the plug-in backplate to the main switch and/or one or more of the ground or neutral bus bars. The assembly and pre-wiring can include pre-wiring a connector to a corresponding breaker. The breaker can be installed in the plug-in load center can connected to one or more of a power bus bar, a neutral bus bar, and/or a ground bus bar within the plug-in load center. By pre-wiring the connector receptacles to the breakers and the plug-in back plate to the main switch and neutral and/or ground bus bars, the plug-in load center can be shipped to a construction job site ready to install in a unit with little or no manual wiring needed. This reduction or elimination of manual wiring can provide a more efficient construction process that can also be safer and more reliable. The method continues to 1804.

At 1804, the assembled and pre-wired plug-in load center is shipped to a job construction site. The method continues to 1806.

At 1806, the plug-in load center can be installed in a building (e.g., in a unit within a building being built using a modular prefabrication technique). In contrast to conventional, manually wired load centers, the plug-in load center in accordance with some implementations can be installed without a need to manually connect wires (and thus possibly create a need for one or more licensed electricians to make the manually wired connections), which can significantly reduce the time and expense needed to install the plug-in load center compared to conventional load centers.

Installing the plug-in load center can include physically attaching the plug-in load center to a utility wall and electrically connecting the plug-in load center to a vertical power busway via the plug-in back plate of the plug-in load center. The method continues to 1808.

At 1808, one or more pre-assembled, connectorized wiring assemblies are connected to switch or outlet junction boxes mounted on a prefabricated wall panel using connectors on the wiring assemblies and corresponding connector receptacles on the junction boxes. For example, a first connector on a first end of each of the wiring assemblies can be connected to the junction boxes as the wall is assembled in a factory setting or the wiring assemblies can be connected to the junction boxes at a construction site. The method continues to 1810.

At 1810, the pre-assembled, connectorized wiring assemblies are connected to the plug-in load center. For example, a second connector on a second end of each of the wiring assemblies is inserted and connected to a corresponding connector receptacle on the plug-in load center. At this stage, a load circuit is complete including a junction box connected to a wiring assembly that is in turn connected to the plug-in load center and a corresponding circuit breaker within the plug-in load center to complete a load circuit such that when the plug-in load center is energized and the circuit breaker is in a closed position, the load circuit will be energized. The connection of the load circuit can be made, as described above, without a need for any direct manual wiring connections, which can include, for example, manually wiring ends of one or more wires together or to a terminal point. Accordingly, connection of the load circuit can be performed by personnel that are not licensed electricians, and the connection of the load circuit can be performed in a much faster and reliable way that conventional load circuit manual wiring connection techniques. The method continues to 1812.

At 1812, the plug-in load center is optionally energized. Energizing of the plug-in load center can be performed in accordance with the construction of the building and at a time determined to be safe to energize the load center via the vertical power busway.

Figure 19:
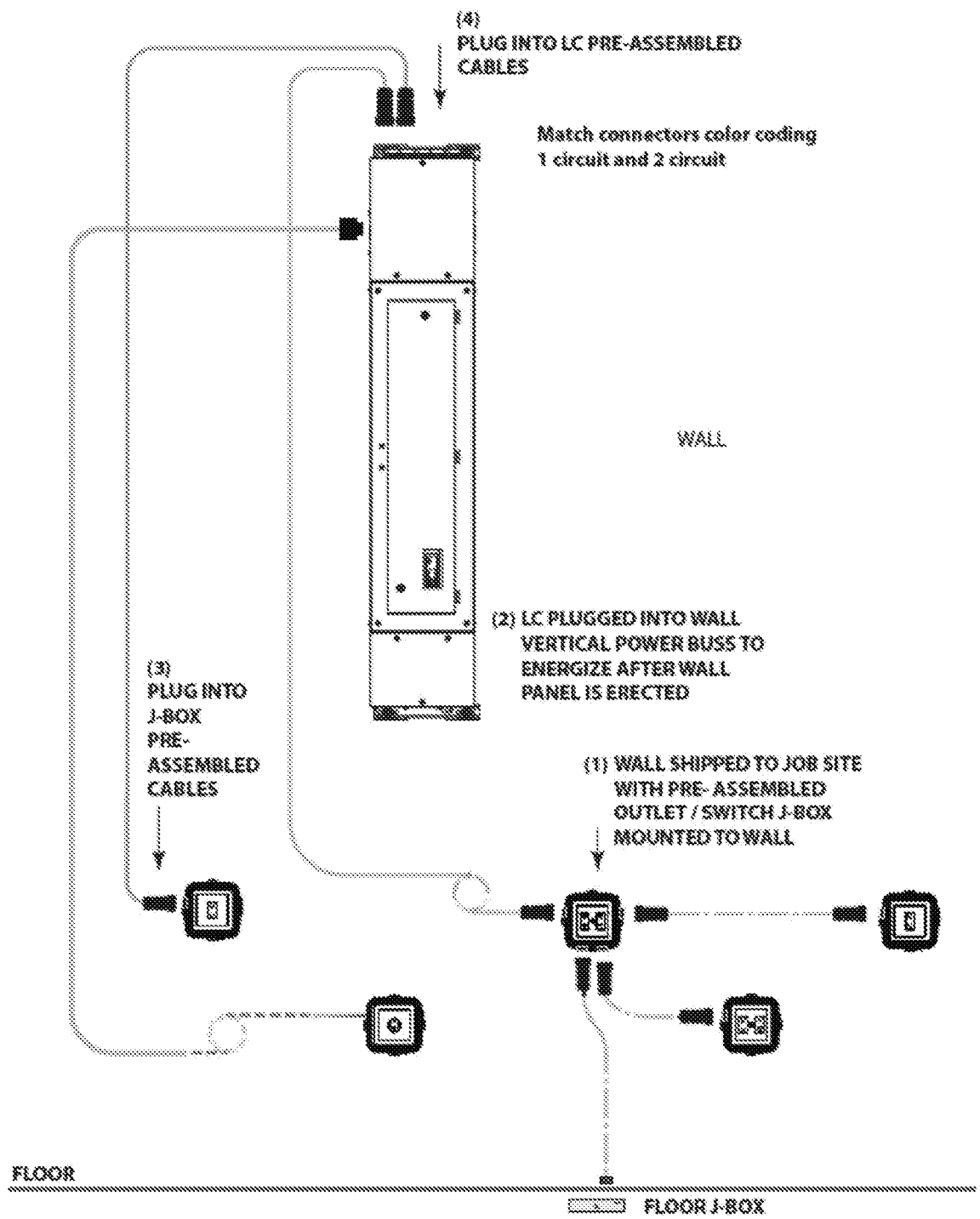
FIG. 19 is a diagram of a plug-in load center within a connectorized electrical system showing an installation sequence in accordance with some implementations.

FIG. 19 is a diagram of a plug-in load center within a connectorized electrical system showing an installation sequence in accordance with some implementations. At step 1 of FIG. 19, a wall (e.g., a prefabricated wall panel) is shipped to a job site with pre-assembled and pre-wired switch or outlet junction boxes mounted to the wall. The junction boxes can be mounted to the wall in a factory setting off site from the building construction site or can be mounted to the wall at the building construction site. At step 2 of FIG. 19, a plug-in load center is plugged into a wall (e.g., a prefabricated utility wall panel having a vertical power busway). At step 3 of FIG. 19, preassembled wiring assemblies are connected to (or plugged into) the junction boxes via connectors and connector receptacles. At step 4 of FIG. 19, the wiring assemblies are connected to (or plugged into) the plug-in load center via connectors and connector receptacles.

Figure 20:
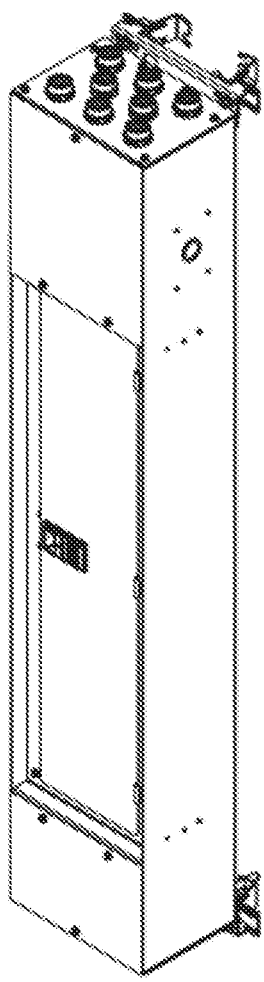
FIG. 20 is a diagram of a plug-in load center in accordance with some implementations.

FIG. 20 is a diagram of a plug-in load center in accordance with some implementations.

Figure 21:
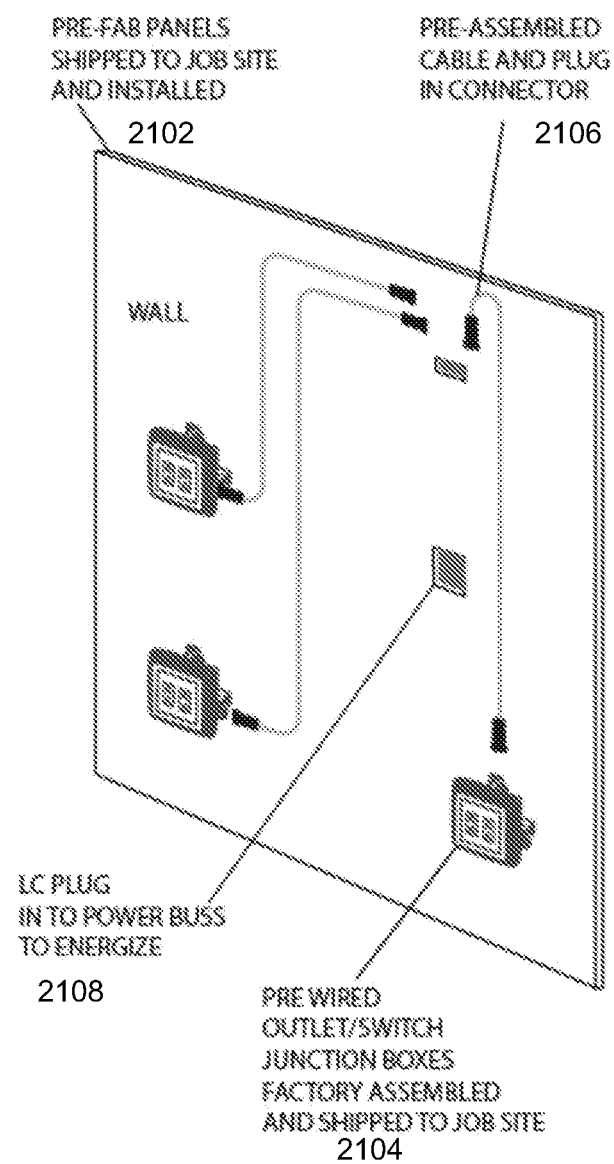
FIG. 21 is a diagram of a prefabricated wall panel having junction boxes and wiring assemblies installed prior to installation of a plug-in load center in accordance with some implementations.

FIG. 21 is a diagram of a prefabricated wall panel 2102 having junction boxes 2104 and wiring assemblies with connectors 2106 installed prior to installation of a plug-in load center. The utility wall includes an opening 2108 for energizing the load center via the vertical busway and plug-in back plate.

Figure 22:
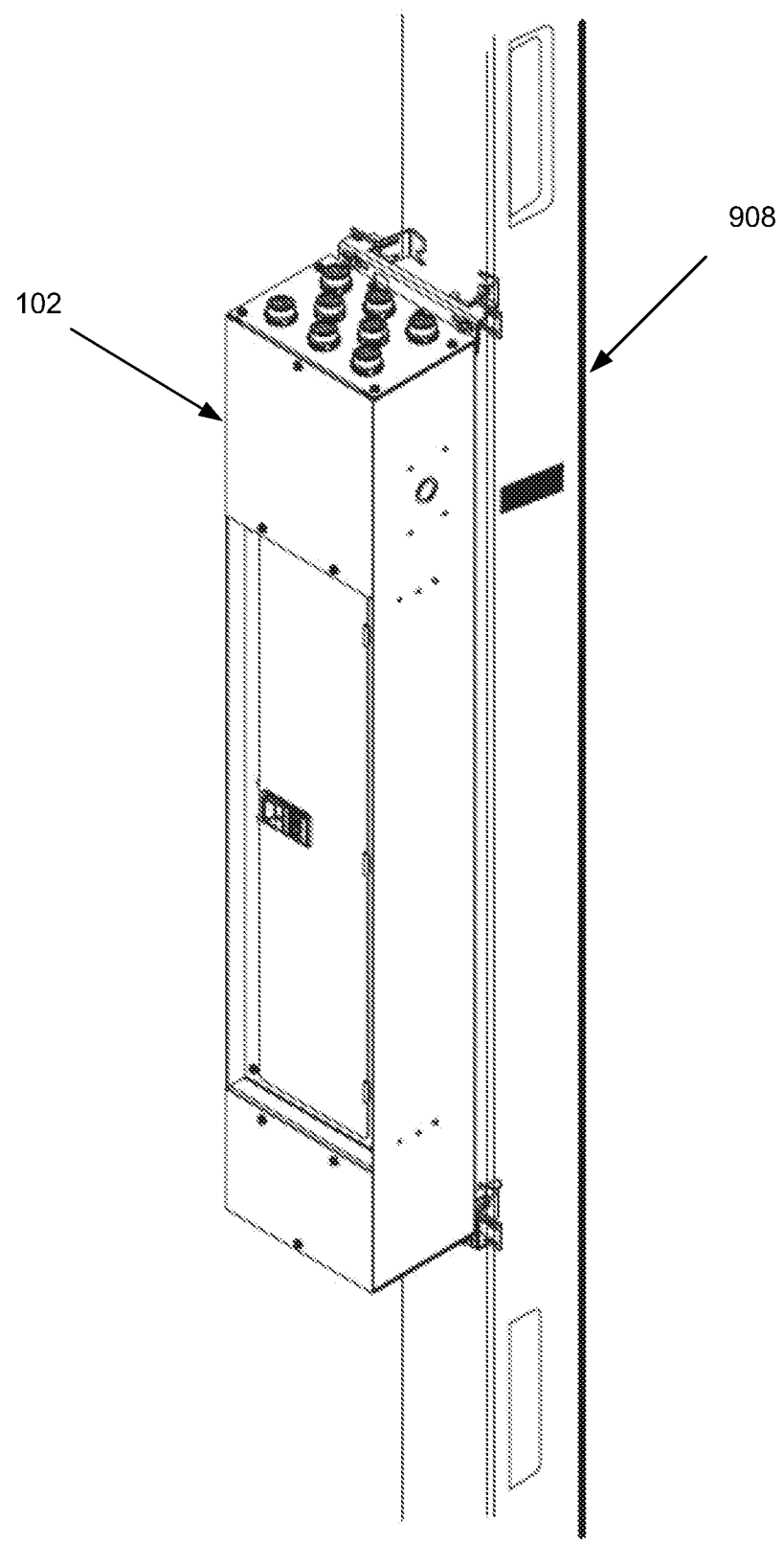
FIG. 22 is a diagram showing an example plug-in load center and vertical power busway in accordance with some implementations.

FIG. 22 is a diagram showing an example plug-in load center 102 and vertical power busway 908 in accordance with some implementations.

Figure 23:
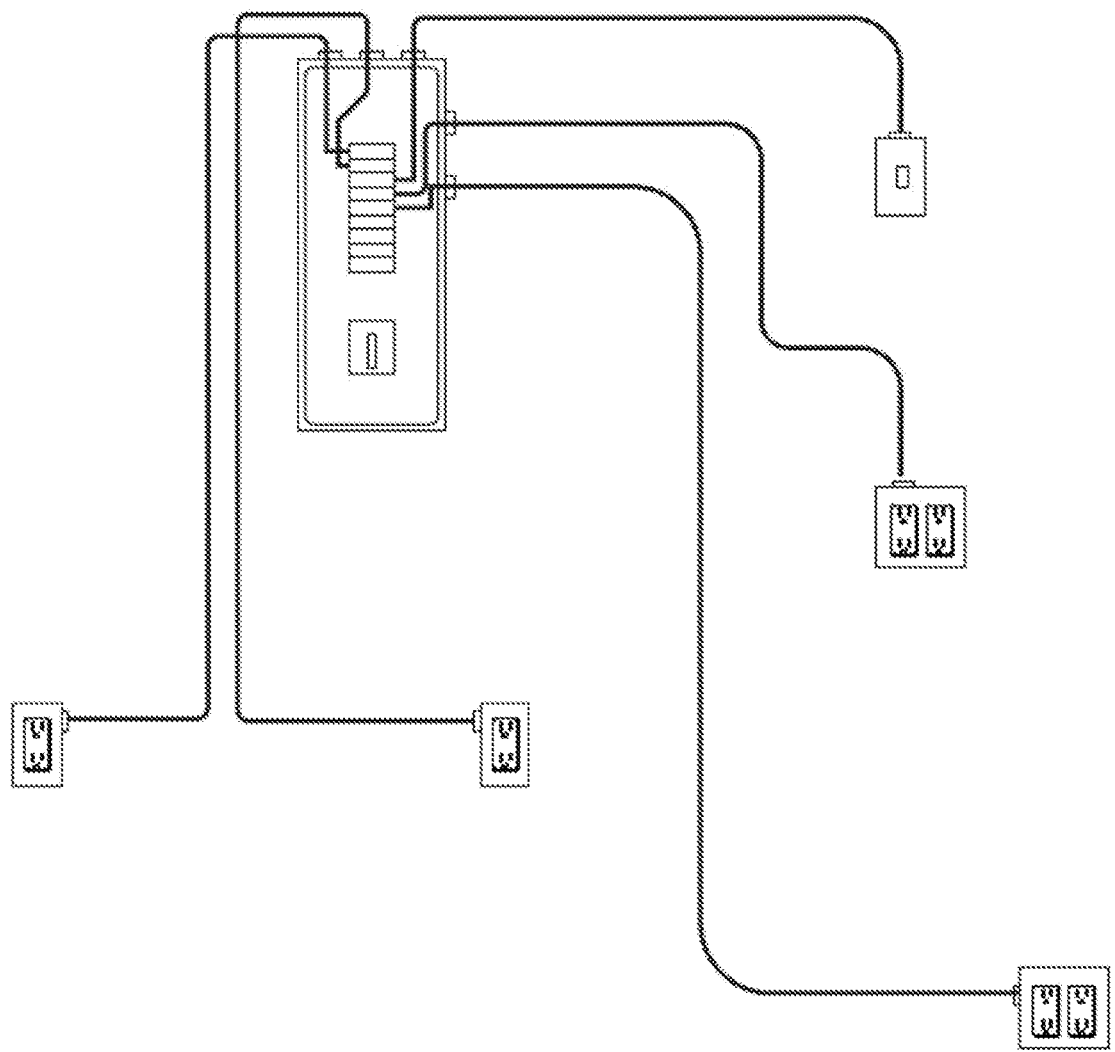
FIG. 23 is a diagram of a conventional load center showing manually wired connections between circuit breakers and switch and outlet junction boxes.

FIG. 23 is a diagram of a conventional load center showing manually wired connections between circuit breakers and switch and outlet junction boxes. In conventional load center wiring and installation, each load circuit is manually wired including wiring one or more switch or outlet junction boxes to a breaker within the conventional load center. Also, not shown in FIG. 23, the conventional load center is often manually wired to a power source, which typically includes dedicated wiring from the power source (e.g., a power meter connection) to the conventional load center. When each conventional load center requires dedicated wiring, the access way for the wiring becomes large compared to the vertical busway approach described above in connection with implementations of the disclosed subject matter. Moreover, convention load center and load circuit wiring as shown in FIG. 19 lacks pre-assembled wiring assemblies and, in particular, pre-assembled wiring assemblies having connectors on each end.

It is therefore apparent that there are provided, in accordance with the various example implementations disclosed herein, load centers, and, in particular, compartmentalized plug-in load centers with connector receptacles and plug-in busway connector plates, and methods for making and installing the same.

While the disclosed subject matter has been described in conjunction with several implementations, it is evident that many alternatives, modifications, equivalents, and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. A load center, comprising:
a housing having a junction box compartment, a circuit breaker compartment, and a back-plate compartment;
one or more circuit breakers disposed in the circuit breaker compartment;
a main switch disposed in the circuit breaker compartment;
one or more connector receptacles mounted on a top of the housing, wherein each connector receptacle is connected to a corresponding circuit breaker, and wherein each connector receptacle is configured to engage a connector of a wiring assembly; and
a plug-in back plate configured to mount in the back-plate compartment and having one or more vertical power busway conductor connectors, wherein each of the one or more vertical power busway conductor connectors are connected to a corresponding connection point within the load center.

2. The load center of claim 1, further comprising a neutral bus and a ground bar disposed within the housing, and wherein the one or more circuit breakers are configured to connect directly to at least one of the neutral bus or the ground bus.

3. The load center of claim 2, wherein the one or more vertical power busway conductor connectors are configured to connect to a corresponding power conductor of a vertical power busway.

4. The load center of claim 3, wherein the one or more vertical power busway conductor connectors includes a ground conductor busway connector configured to connect to a ground conductor, a neutral conductor busway connector configured to connect to a neutral conductor, and one or more power conductor busway connectors configured to connect to respective power conductors of the vertical power busway, wherein the ground conductor busway connector is wired to the ground bar, wherein the neutral conductor busway connector is wired to the neutral bus, and wherein the one or more power conductor busway connectors are connected to respective power conductors of the vertical power busway and are wired to the main switch.

5. The load center of claim 1, further comprising a top bracket disposed on a back of the housing near the top of the housing, and a bottom bracket disposed on the back of the housing near a bottom of the housing.

6. The load center of claim 1, further comprising one or more junction boxes disposed within the junction box compartment.

7. The load center of claim 1, wherein the housing is configured to be installed in a utility wall in a space between a utility wall core and one or more finish panels of the utility wall.

8. The load center of claim 3, further comprising an infrared viewing port to permit measurement of infrared energy from the plug-in back plate to the vertical power busway.

9. The load center of claim 1, further comprising:
one or more thermal sensors to measure a temperature of a component within the load center or within a vertical power busway; and
a processing and communication system coupled to the one or more thermal sensors to receive signals from the one or more sensors and configured to transmit data values representing the signals.

10. The load center of claim 1, further comprising a current monitoring device configured to monitor current of the load center and provide an indication of current use to an external system.

11. The load center of claim 1, further comprising circuit breakers that are configured to be individually controllable remotely and to provide an indication of current use by the breaker to a remote system.

12. A load center, comprising:
a housing having a circuit breaker compartment and a back-plate compartment;
one or more circuit breakers disposed in the circuit breaker compartment;
a main switch disposed in the circuit breaker compartment;
one or more connector receptacles mounted on a top of the housing, wherein each connector receptacle is connected to a corresponding circuit breaker, and wherein each connector receptacle is configured to engage a connector of a wiring assembly; and
a plug-in back plate configured to mount in the back-plate compartment and having one or more vertical power busway conductor connectors, wherein each of the one or more vertical power busway conductor connectors are connected to a corresponding connection point within the load center.

* * * * *